United States Patent
Georgy et al.

(10) Patent No.: US 9,719,787 B2
(45) Date of Patent: Aug. 1, 2017

(54) METHOD AND SYSTEM FOR MULTIPLE PASS SMOOTHING

(71) Applicant: InvenSense, Inc., San Jose, CA (US)

(72) Inventors: Jacques Georgy, Calgary (CA); You Li, Calgary (CA); Medhat Omr, Calgary (CA); Christopher Goodall, Calgary (CA); Hsui-Wen Chang, Calgary (CA)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 15/054,792

(22) Filed: Feb. 26, 2016

(65) Prior Publication Data

US 2016/0252354 A1    Sep. 1, 2016

Related U.S. Application Data

(60) Provisional application No. 62/121,079, filed on Feb. 26, 2015.

(51) Int. Cl.
*G01C 21/16* (2006.01)
*G01C 21/18* (2006.01)
*G01S 19/49* (2010.01)

(52) U.S. Cl.
CPC .......... *G01C 21/165* (2013.01); *G01C 21/18* (2013.01); *G01S 19/49* (2013.01)

(58) Field of Classification Search
CPC ................................ G01C 21/18; G01S 19/49
See application file for complete search history.

(56) References Cited

U.S. PATENT DOCUMENTS

| | | | | |
|---|---|---|---|---|
| 6,882,964 B2* | 4/2005 | Bayard | ............... | G01C 21/16 600/484 |
| 7,103,471 B2* | 9/2006 | Levi | ............... | A61B 5/1116 235/105 |
| 7,429,951 B2* | 9/2008 | Kennedy, Jr. | ............... | G01S 5/021 342/451 |
| 7,761,233 B2* | 7/2010 | Schott | ............... | G01C 21/005 701/434 |
| 7,890,260 B2* | 2/2011 | Ring | ............... | G01C 21/16 340/988 |
| 8,169,364 B2* | 5/2012 | Wirola | ............... | G01S 19/55 342/357.34 |
| 8,412,456 B2* | 4/2013 | Roh | ............... | G01S 19/49 342/357.32 |

(Continued)

*Primary Examiner* — Angela Ortiz
*Assistant Examiner* — Alex C Dunn
(74) *Attorney, Agent, or Firm* — Bay Area Technology Law Group PC

(57) ABSTRACT

The navigation solution of a device may be enhanced by perforating multiple pass smoothing. Forward and backward processing of the input data may be performed to derive interim navigation solutions. One or more quantities of the interim navigation solutions may be combined to smooth the quantities. At least one additional pass of forward and backward processing may then be performed using quantities of the navigation solution that were combined to enhance the interim navigation solutions. Next, at least one uncombined quantity of the navigation solution from the enhanced interim navigation solution is combined to provide an enhanced smoothed navigation solution. Additional passes may be performed to combine other quantities of the navigation solution as desired.

49 Claims, 22 Drawing Sheets

(56) References Cited

U.S. PATENT DOCUMENTS

| | | | |
|---|---|---|---|
| 8,473,207 B2* | 6/2013 | Roh | G01S 19/47 |
| | | | 701/500 |
| 8,762,055 B2* | 6/2014 | Nash | G01C 21/12 |
| | | | 701/500 |
| 9,068,842 B2* | 6/2015 | Youssef | G01C 21/165 |
| 2002/0111717 A1* | 8/2002 | Scherzinger | G01S 19/49 |
| | | | 701/1 |
| 2012/0221244 A1* | 8/2012 | Georgy | G01C 21/165 |
| | | | 701/472 |

* cited by examiner

METHOD AND SYSTEM FOR MULTIPLE PASS SMOOTHING

CROSS REFERENCE TO RELATED APPLICATIONS

This application claims priority from and benefit of U.S. Provisional Patent Application Ser. No. 62/121,079, filed Feb. 26, 2011 which is entitled "METHOD AND SYSTEM FOR MULTIPLE PASS SMOOTHING," which is assigned to the assignee hereof and is incorporated by reference in its entirety.

FIELD OF THE PRESENT DISCLOSURE

The present disclosure relates to a method and system for enhancing a navigation solution for a device and more particularly to techniques for performing multiple pass smoothing.

BACKGROUND

Portable electronic devices, such as those configured to be handheld or otherwise associated with a user, are employed in a wide variety of applications and environments. Increasingly, such devices are equipped with one or more sensors or other systems for determining the position or motion of the portable device. Notably, devices such as smartphones, tablets, smart watches or other portable devices may feature low cost Micro-Electro-Mechanical Systems (MEMS) sensors, such as gyroscopes, accelerometers, magnetometers, and barometers. These sensors are small and lightweight, consume little power, and are extremely low-cost. By virtue of these advantages. MEMS sensors have become appropriate candidates for motion tracking and navigation applications. For consumer portable devices, inertial navigation systems (INS), and dead-reckoning such as pedestrian dead-reckoning (PDR) can be used to navigate with inertial sensors. PDR may be the algorithm used to navigate with inertial sensors in case of on-foot motion, such as walking or running, other dead-reckoning techniques can be used such as vehicular dead-reckoning (when speed of vehicle is measured) or cycling dead-reckoning (when periodic motion is detected). INS may also be used in vehicles or other vessels. Inertial sensors are not dependent on the transmission or reception of signals from an external source; thus, they are ideal for providing continuous information in indoor/outdoor environments.

However, inertia sensors provide only short-term accuracy and suffer from accuracy degradation over time. Although the horizontal attitude (i.e., roll and pitch) errors can be controlled by accelerometer measurements, the heading error typically grows when there is no aiding information. Furthermore, there is a misalignment issue in portable navigation application (such as for example pedestrian applications among others) because the orientation of mobile devices can keep changing relative to the movement of the platform or users body. To correct for the increasing errors, external technologies such as absolute navigational information, such as a Global Navigation Satellite System (GNSS) or magnetometers may be needed. Such technologies may not provide sufficient reliability. Specifically, typical GNSS signals are too weak to penetrate into indoor environments; also, there are significant multi-path effects in deep urban areas. Further, when using magnetometers, the local magnetic field is susceptible to interferences from man-made infrastructiues in indoor or urban environments, which makes magnetometer-derived heading angles unreliable.

As a result, multi-sensor integrated navigation performance may not meet the requirement of all applications, especially for portable navigation. Hence, other methods such as smoothing are required to enhance the navigation performance. Portable navigation where the device containing the sensors can move constrained or unconstrained with in a platform (user, vehicle, or vessel of any type), and where the orientation of the device can change freely with respect to the platform, and where the platform can go to any environment (even with no absolute navigational information available) presents a challenging conditions for existing smoothing techniques that may not be able to provide a desired level of performance. Thus, there is a need for more efficient smoothing techniques to be able to cope with all challenges, especially those of portable navigation. As will be described in the following materials, this disclosure satisfies these and other needs.

SUMMARY

As will be described in detail below, this disclosure includes a method for enhancing a navigation solution of a device and a platform through multiple pass smoothing, wherein the mobility of the device is constrained or unconstrained within the platform and wherein the device may be tilted to any orientation. The method may involve obtaining input data including sensor data, for the device representing motion of the device at plurality of epochs from a first instant to a subsequent second instant performing forward processing of the input data to derive interim forward navigation solutions for the epochs, performing backward processing of the input data to derive interim backward navigation solutions for the epochs, combining at least one quantity of the navigation solution from the interim forward and backward navigation solutions to obtain a smoothed version of the at least one combined quantity, performing forward processing: of the input data and the at least one combined quantity to derive enhanced interim forward navigation solutions for the epochs, performing backward processing of the input data and the at least one combined quantity to derive enhanced interim backward navigation solutions for the epochs, combining at least one uncombined quantity of the navigation solution from the enhanced interim forward and backward navigation solutions to obtain an enhanced smoothed navigation solution and providing the enhanced smoothed navigation solution.

Further, the techniques of this disclosure may be implemented using a device. The device may have an integrated sensor assembly, configured to output sensor data representing motion of the device for the device at a plurality of epochs from a first instant to a subsequent second instant, and a processor configured to implement an MPS navigation module to derive an enhanced smoothed navigation solutions by obtaining input data that includes the sensor data, performing forward processing of the input data to derive interim forward navigation solutions for the epochs, performing backward processing of the input data to derive interim backward navigation solutions for the epochs, combining at least one quantity of the navigation solution from the interim forward and backward navigation solutions to obtain a smoothed version of the at least one combined quantity, performing forward processing of the input data, and the at least one combined quantity to derive enhanced interim forward navigation solutions for the epochs, performing backward processing of the input data and the at least one combined quantity to derive enhanced interim backward navigation solutions for the epochs, combining at least one uncombined quantity of the navigation solution from the enhanced interim forward and backward navigation solutions to obtain an enhanced smoothed navigation solution and: providing the enhanced smoothed navigation solution.

This disclosure also includes a server for enhancing a navigation solution of a device and a platform through multiple pass smoothing. The server may have a communications module for receiving input data provided by the device, wherein the Input data includes sensor data for the device representing motion of the device at a plurality of epochs from a first instant to a subsequent second instant, and a processor configured to implement an MPS navigation module to derive enhanced smoothed navigation solution for the device by obtaining interim forward navigation solutions for the epochs, performing backward processing of the input data to derive interim backward navigation solutions for the epochs, combining at least one quantity of the navigation solution from the interim backward navigation solutions and an interim forward navigation solution to obtain a smoothed version of the at least one combined quantity, performing forward processing of the input data and the at least one combined quantity to derive enhanced interim forward navigation solutions for the epochs, performing backward processing of the input data and the at least one combined quantity to derive enhanced interim backward navigation solutions for the epochs, combining at least one uncombined quantity of the navigation solution from the enhanced interim forward and backward navigation solutions to obtain an enhanced smoothed navigation solution and providing the enhanced smoothed navigation solution.

Still further, this disclosure includes a system for providing an enhanced smoothed: navigation solution through multiple pass smoothing. The system may have a device comprising an integrated sensor assembly, configured to provide input data comprising sensor data representing motion of the device for the device at a plurality of epochs from a first instant to a second instant, and a communications module for transmitting the input date and remote processing resources configured to receive the input data from the device and having a processor configured to implement an MPS navigation module to derive an enhanced smoothed navigation solution for the device by obtaining interim forward navigation solutions for the epochs, performing backward processing of the input data to derive interim backward navigation solutions for the epochs, combining at least one quantity of the navigation solution from the interim backward navigation solutions and an interim forward navigation solution to obtain a smoothed version of the at least one combined quantity, performing forward processing of the input data and the at least one combined quantity to derive enhanced interim forward navigation solutions for the epochs, performing backward processing of the input data and the at least one combined quantity to derive enhanced interim backward navigation solutions for the epochs, combining at least one uncombined quantity of the navigation solution from the enhanced interim forward and backward navigation solutions to obtain an enhanced smoothed navigation solution and providing the enhanced smoothed navigation solution.

DETAILED DESCRIPTION

Figure 1:
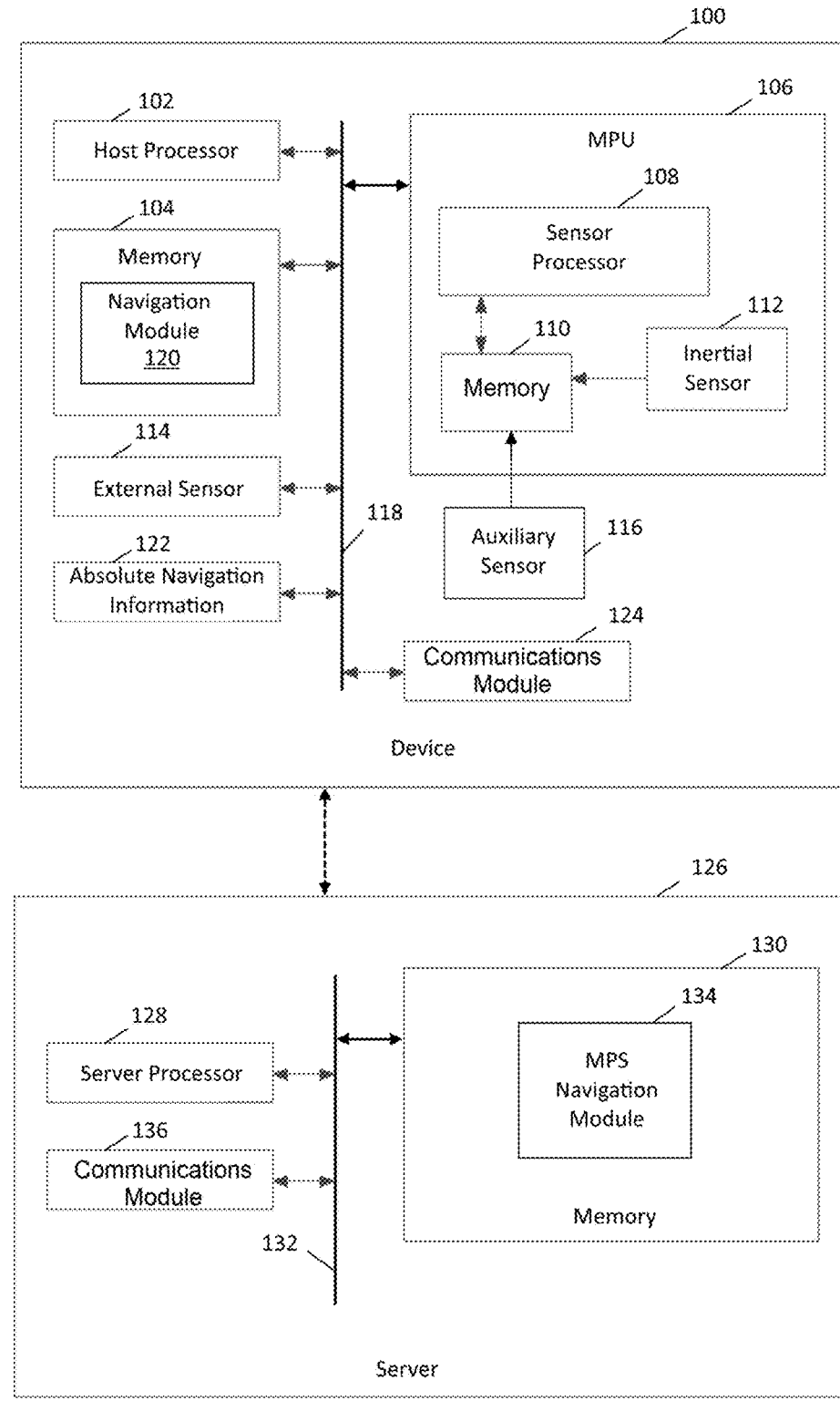
FIG. 1 is schematic diagram of a system for enhancing a navigation solution through multiple pass smoothing according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification, it will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present, in contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient, labels applied to these quantities. Unless specifically stated otherwise as apparent from the following discussions. It is appreciated that throughout the present application, discussions utilizing the terms such as "accessing," "receiving," "sending," "using" "selecting," "determining" "normalizing" "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such, as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures single block may be described as performing a function or functions; however, in actual practice, the function or functions performed by that block may be performed in a single component or across multiple components, and/or may be performed using hard ware, using software, or using a combination of hardware and software. To clearly illustrate this interchangeability of hardware and software, various illustrative components blocks, modules, circuits, and steps have been described as generally in terms of their functionality. Whether such functionality is implemented as hardware or software depends upon the particular application and design constraints Imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation on of the techniques described herein. In addition, in some aspects, the functionality described herein may be provided within dedicated software modules or hardware: modules configured as described herein. Also, the techniques could be fully implemented in one or more circuits or logic elements, A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or mom microprocessors in conjunction with an MPU core, or any other such configuration.

Unless defined otherwise, all techniques and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

The techniques of this disclosure am directed to enhancing a navigation solution of a device by performing multiple pass smoothing (MPS) while forward and backward processing input data that may include motion sensor data, such as gyroscope data and accelerometer data. Input data may including information from other sources when available, such as absolute navigation information, models of user dynamics (e.g., step length estimation), characteristics of sensor performance (e.g.), supplemental sensor data and others. The navigation solution being enhanced may include any suitable information related to the position, motion and/or orientation of the device, for example, a navigation solution may include position, velocity and attitude, position and attitude, position and velocity, position and speed, attitude alone or other combinations of these quantities. The navigation solution may also include other related quantities, such as the quantities used for the errors in input data. The term navigation used in this application is not limited to online or real-time navigation solutions, it may also include offline or post-processing solutions among others.

Generally, forward and backward processing of the input data may be performed to derive interim navigation solutions. One or more quantities of the interim navigation solutions may be combined to smooth the quantities. At least one additional pass of forward and backward processing may then be performed using quantities of the navigation solution that were combined to enhance the interim navigation solutions. Next, at least one uncombined quantity of the navigation solution from the enhanced interim navigation solution is combined to provide an enhanced smoothed navigation solution, Additional passes may be performed to combine other quantities of the navigation solution as desired.

The MPS techniques of this disclosure may be utilized in any application, e.g., walking, running, cycling and in vehicles or any type of vessel, and for any use case, e.g., handheld, on the ear, dangling, in a pocket, on seat, on cradle among others. Additionally, these MPS techniques may be employed when any navigation technology, e.g., PDR, INS, GNSS, or integrated navigation solution, is used to derive the navigation solution, further, these MPS techniques may be applied to inertial sensor data alone (e.g., gyroscopes and accelerometers) as well as to input data when information from additional sources, including other sensors (e.g., magnetometers and barometers), technologies (e.g., GNSS, WiFi, and odometers), or updates (e.g., pedestrian motion models) is available. Furthermore, these MPS techniques may be used in conjunction with any type of state-estimation to derive the navigation solution, including Kalman filtering, particle filtering, among others. Still further, these MPS techniques may be employed whenever logged sensor data is available. As such, the techniques may be used (i) after a mission (i.e., after finishing data logging and the forward navigation solution) whether on-site or any time afterward; or (ii) within the mission by having blocks of logged sensor readings as well as forward filtering results, and either run the backward smoothing (a) in a backward routine of on another processor or core, or (b) during intentional stopping periods that allow the backward processing to be performed.

To help illustrate these aspects, a representative system for enhancing a navigation solution for a device through MPS is schematically depicted in FIG. 1, with device 100 represented by high level schematic blocks. As will be appreciated, device 100 may be implemented as a device or apparatus, such as a portable device or a handheld device that can be moved in space by a user and its motion, location and/or orientation in space therefore sensed, for example, such a portable device may be a mobile phone (e.g., smartphone cellular phone, a phone running on a local network, or any other telephone handset), tablet, personal digital assistant (PDA), video game player, video game controller, navigation device, wearable device (e.g., glasses, watch, belt clip, fitness tracker, virtual or augmented reality equipment mobile internet device (MID), personal navigation device (PND), digital still camera, digital video camera, binoculars, telephoto lens, portable music, video or media player, remote control or other handheld device, or a combination of one or more of these devices. In addition to these exemplary portable devices, device 100 may also include other types of devices that are not handheld, including autonomous or piloted vehicles whether land-based, aerial, or underwater vehicles, or equipment that may be used with such vehicles. As an illustration only and without limitation, the vehicle may be a drone, also known as an unmanned aerial vehicle (UAV).

As shown, device 100 includes a host processor 102, which may be one or more microprocessors, central processing units (CPUs), or other processors to run software programs; which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated motion processing unit (MPU™) 106 featuring sensor processor 108, memory 110 and inertial sensor 112. Memory 110 may store algorithms, routines or other instructions for processing data output by inertial sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Correspondingly, the sensor data from inertial sensor 112 represents motion of the device at a plurality of epochs front a first instant to a subsequent second instant. Depending on the configuration, MPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using Micro Electro Mechanical System (MEMS) to be integrated with MPU 106 in a single package. Exemplary details regarding suitable configurations of host processor 102 and MPU 106 may be found in co-pending, commonly owned U.S. patent application Ser. No. 11/774,488, filed Jul. 6, 2007, and Ser. No. 12/106,921, filed Apr. 11, 2001 which are hereby incorporated by reference in their entirety. Suitable implementations for MPU 106 in device 100 are available from InvenSense, Inc. of Sunnyvale, Calif.

Alternatively or in addition, device 100 may implement a sensor assembly in the form of external sensor 114. This is optional and not required in all embodiments. External sensor may represent one or more sensors as described above, such as an accelerometer and/or a gyroscope, which output data for use in deriving a navigation solution. In some embodiment, external sensor 114 may be an odometer. As used herein, "external" means a sensor that is not integrated with MPU 106 and may be remote or local to device 100. Also alternatively or in addition, MPU 106 may receive data from an auxiliary sensor 116 configured to measure one or more aspects about the environment surrounding device 100. This is optional and not required in all embodiments. For example, a barometer and/or a magnetometer may be used to refine position determinations made using inertial sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Although described in the context of one or more sensors being MEMS based the techniques of this disclosure may be applied to any sensor design or implementation.

In the embodiment shown, host processor 102, memory 104, MPU 106 and other components of device 100 may be coupled through bus 118, which may be any suitable bus or interlace, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

In one aspect, the various operations of this disclosure used to derive a navigation solution for device 100 may be implemented through navigation module 120 as a set of suitable instructions stored in memory 104 that may be read and executed by host processor 102. Navigation module 120 may employ a reference-based strategy, a self-contained strategy, or any combination of strategies to provide any desired degree of location awareness capabilities. For example, navigation module 120 may employ inertial navigation techniques utilizing sensor data, such as from inertial sensor 112 and/or external sensor 114, as obtained for a current sensor epoch to derive a navigation solution for that epoch. Such techniques may involve dead reckoning or the like, and may determine an orientation for device 100, including values such as any roll, pitch, and azimuth (heading) angles. The navigation solutions derived by navigation module 120 represent contemporaneous determinations of position information for device 100, and as such, may represent forward processing of input data that includes at least the sensor data. Although some transmission, some possible buffering, and processing time may be required, the results are at least near real time (there could be some possible latencies) and may use any information available up until the time the navigation solution is derived. Still further, navigation module 120 may also be configured to determine a motion mode that indicates the user's motion patterns, which may include without limitation, walking, driving, running, going up/down stairs, riding an elevator, walking/standing on an escalator, and other similar motion patterns. In some embodiments, navigation module 120 may employ a real-time map matching routine to aid the derivation of navigation solutions in a causal manner. By performing a forward processing of the input data foam the first instant to the second instant, such as for an entire trajectory, memory space may be allocated more efficiently. Further, misalignment angle determinations or use case determinations may be made that facilitate subsequent operations or may be used in place of particular quantities derived from the MPS process as warranted.

Navigation module 120 may also use a source of absolute navigation information 122, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons or other similar methods when deriving a navigation solution. This is optional and not required in ail embodiments. Navigation module 120 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Further, device 100 may also have a communications module 124 for transmitting and/or receiving information, including navigation solutions derived by navigation module 120.

Multiple layers of software may be employed as desired and stored in any combination of memory 104, memory 110, or other suitable location, for example, a motion algorithm layer can provide motion algorithms that provide lower-level processing for raw sensor data provided from the motion sensors and other sensors, A sensor de vice driver layer may provide a software interlace to the hardware sensors of device 100. Further, a suitable application program interface (API) may be provided to facilitate communication between host processor 102 and MPU 106, for example, to transmit desired sensor processing tasks.

In this exemplary system, device 100 communicates raw sensor data or interim forward navigation solutions derived for a plurality of sensor epochs from a first instant to a subsequent second instant to remote processing resources, such as server 126. Subsequent to the second instant, server 126 may then perform an MPS process according to the techniques of this disclosure using the navigation solutions from device 100 to provide an enhanced smoothed navigation solution for at least one of the sensor epochs. One suitable architecture of server 126 is depicted using high level schematic blocks in FIG. 1, and may include server processor 128 that is in communication with memory 130 over bus 132. As will be described in further-detail below, server processor 128 may execute instructions stored in memory 130 that are represented as functional blocks, including MPS navigation module 134. Either or both navigation module 120 and MPS navigation module 134 may determine a motion mode, but server 126 may have advantages associated with the availability of both past and future information for motion detection at a given time and/or may have greater processing resources available to perform more sophisticated algorithms, and correspondingly may be give greater weight if conflicting detections exist.

By combining quantities from navigation solutions derived by multiple passes of forward and backward processing, the quantities may be smoothed and used in subsequent forward and backward processing operations and/or incorporated into an enhanced smoothed navigation solution. The enhanced smoothed navigation solution may be fed back to navigation module 120 as desired. Accordingly, server 126 may also include a communications module 136 receive raw sensor data or navigation solutions for device 100 derived by navigation module 120, and if desired, may transmit information related to the enhanced smoothed navigation solution to device 100 or to another destination. Communications between device 100 and server 126 may employ any suitable protocol. For example, a shorter range, low power communication protocol such as BLUETOOTH®, ZigBee®, ANT or a wired connection may be used or a longer range-communication protocol, such as a transmission control protocol, internet protocol (TCP/IP) packet-based communication, accessed using a wireless local area network (WLAN), cell phone protocol or the like may be used. In general, the system depicted in FIG. 1 may embody aspects of a networked or distributed computing environment, devices 100 and server 126 may communicate either directly or indirectly, such as through multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the internet, which provides an infrastructure for widely distributed computing and encompasses many different networks, though any network infrastructure can be used for exemplary communications made incident to the techniques as described in various embodiments.

As noted, device 100 may derive interim forward navigation solutions and server 120 may apply MPS techniques, including deriving interim backward navigation solutions as well as enhanced interim forward and backward navigation solutions to smooth quantities of the navigation solution and provide an enhanced smoothed navigation solution. However, any or ail of the functions described as being associated with the MPS process may be performed by any number of discrete devices in communication with each other, or may be performed by device 100 itself in other suitable system architectures. For example, in one non-limiting embodiment, navigational module 120 may be omitted or in a non-operational or reduced power state, so that device 100 communicates raw sensor data, and any other available input data, to server 126, which in turn derives the interim forward navigation solutions as well as performing the other operations associated with the MPS techniques of this disclosure. Accordingly, it should be appreciated that any suitable division of processing resources may be employed whether within one device or among a plurality of devices. Further, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 102, sensor processor 108, server processor 128, a dedicated processor or any other processing resources of device 100, server 120 or other remote processing resources, or may be implemented using any desired combination of software, hardware and firmware.

Figure 2:
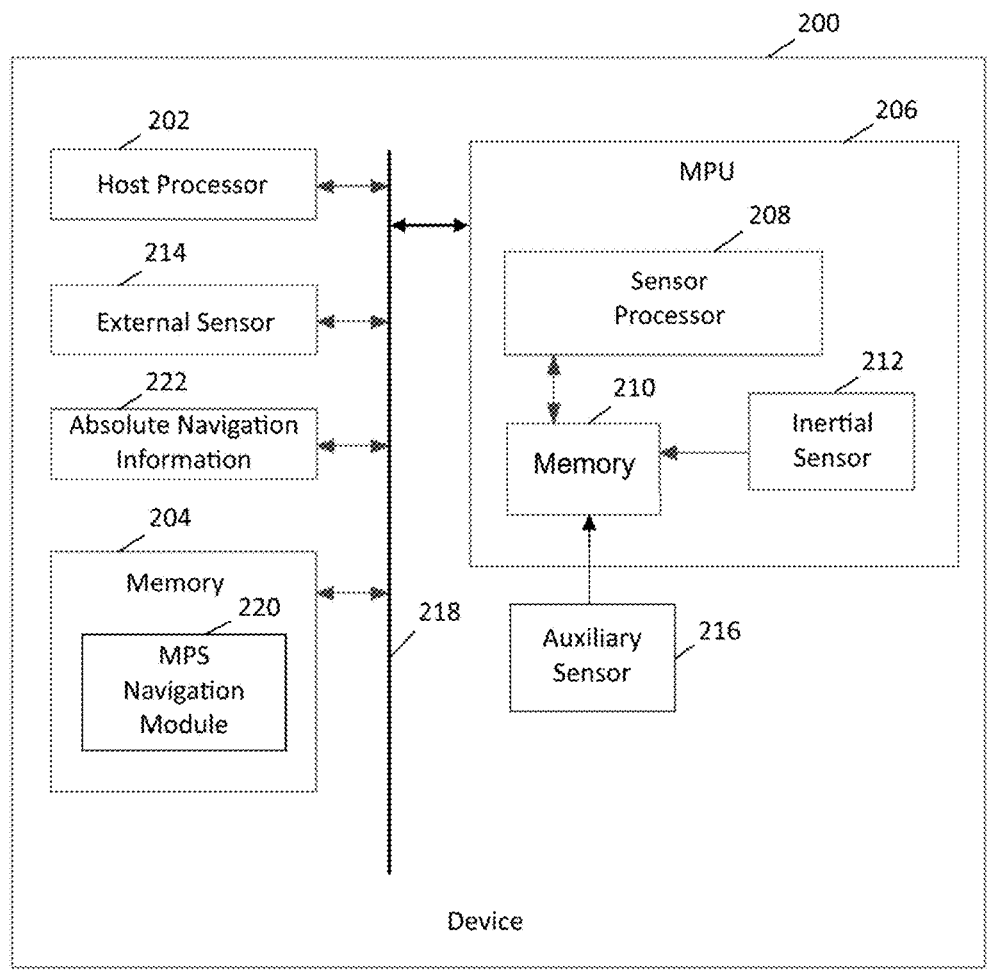
FIG. 2 is schematic diagram of a device for enhancing a navigation solution through multiple pass smoothing according to an embodiment.

As another illustrative, but non-limiting example, the embodiment schematically depicted in FIG. 2 represents a device in which the MPS process to provide an enhanced smoothed navigation solution is performed locally. For example, the interim forward navigation, solution may be derived contemporaneously as sensor data is being obtained, while the backward processing to derive the interim backward navigation solution and the forward and backward processing to derive the enhanced interim navigation solutions may be performed at a subsequent time, such as in a background process or when additional power or computing resources are available. Similar components have corresponding reference numbers (such as, device 100 of FIG. 1 may correspond to device 300 of FIG. 2). Accordingly, device 200 includes a host processor 202, which may be one or more microprocessors, central processing units (CPUs), or other processors to run software programs, which may be stored in memory 204, associated with the functions of device 200. Multiple layers of software can be provided in memory 204. Device 200 includes at least one sensor assembly, as shown here in the form of integrated motion processing unit (MPU™) 206 featuring sensor processor 208, memory 210 and inertial sensor 212. Memory 210 may store algorithms, routines or other instructions for processing data output by inertial sensor 212 and/or other sensors as described below using logic or controllers of sensor processor 208, as well as storing raw data and/or motion data output by inertial sensor 212 or other sensors. Inertial sensor 212 may be one or mote sensors for measuring motion of device 200 in space, such as a gyroscope and/or an accelerometer as described above, Device 200 may also implement a sensor assembly in the form of external sensor 214. This is optional and not required in all embodiments. Also alternatively or in addition, MPU 206 may receive data from an auxiliary sensor 216 configured to measure one or more aspects about the environment surrounding device 200. This is optional and not required in all embodiments. In the embodiment shown, host processor 202, memory 204, MPU 200 and other components of device 200 may be coupled through bus 218, which may be any suitable bus or interface. Device 200 may also have a source of absolute navigation information 222, which is optional and not required in all embodiments.

In this embodiment, device 200 includes MPS navigation module 220, representing instructions stored in memory 204 for execution by host processor 202 to derive an interim forward navigation solution for device 200 using the sensor data and other input data at each epoch. Subsequent to the first instant, MPS navigation module 220 may then perform other operations associated with MPS as described in this disclosure, including deriving interim backward navigation solutions as well as enhanced interim forward and backward navigation solutions to smooth quantities of the navigation solution and provide an enhanced smoothed navigation solution.

Figure 3:
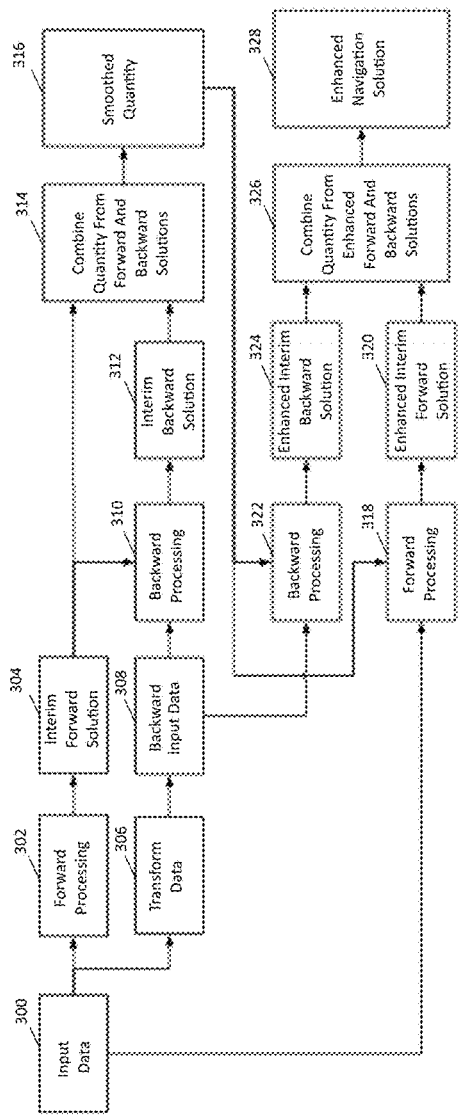
FIG. 3 is a flowchart of a routine for enhancing a navigation solution through multiple pass smoothing according to an embodiment.

A representative routine involving the techniques of this disclosure is depicted in FIG. 3. Beginning with 300, input data including sensor data, as well as information from other sources if available, is obtained, in 302, a forward processing operation is performed for the data starting with the first instant and progressing to the second instant to derive an interim forward navigation solution in 304. As noted above, this aspect may be performed locally with respect to the device or remotely. One or more transformations of the input data may be performed in 306 as will be described below to generate backward input data in 308. The transformation converts the sensor data and other input data to a format corresponding to starting a trajectory at the second instant and ending the trajectory at the first instant. Accordingly, the transformed input data may be backward processed in 310 to derive an interim backward navigation solution in 312. Information from the interim forward navigation solution may be used during this operation. In this embodiment, the transformation of the input data allows the backward processing to employ the same algorithm as used for forward processing. In other embodiments, a different algorithm may be applied for the backward processing, which may obviate the transformation of the input depending on the nature of the algorithm.

At least one quantity of the navigation solution from the interim forward and backward navigation solutions may be combined in 314 to generate a navigation solution that incorporates the smoothed quantity. Multiple quantities may be combined at this stage of the process if they am independent. Next, another forward processing operation is performed in 318 to derive an enhanced interim forward navigation solution in 330 using the input data and the quantity or quantifies that were smoothed by combination in 314. Similarly, another backward processing operation is performed in 322 to derive an enhanced interim backward navigation solution in 324 using the quantity or quantities that were smoothed by combination in 314. The backward processing of 322 may be performed with the backward input data of 308 if the same algorithm as used for the forward processing operation is employed, otherwise the backward processing of 322 may use the input data from 300 or the backward input data of 308 depending on the nature of the algorithm employed.

In 326, at least one quantity of the navigation solution that has yet to be combined from the forward and backward enhanced interim navigation solutions is smoothed by combining. As with the earlier combination, multiple quantities may be combined at this stage if they are independent. At each stage, the smoothed quantity or quantities from the previous iteration may be used in the forward and backward processing operations to update the enhanced interim navigation solutions. Accordingly, the output from 326 is an enhanced smoothed navigation solution in 328 that incorporates any quantities that were smoothed in 314 and 226.

If the quantities of the navigation solution are not independent, the operations of 318 to 326 may be performed iteratively until as many dependent quantities of the navigation solution have been smoothed by combination, such as by performing at least one additional smoothing pass by combining at least one additional quantity of the navigation solution from the enhanced interim forward and backward navigation solutions to obtain a smoothed version of the at least one additional combined quantity and performing forward and backward processing of the input data and the combined quantifies to derive the enhanced interim forward and backward navigation solutions used to the last smoothing operation.

In one aspect, performing forward processing of the input data to derive interim forward navigation solutions for the epochs comprises applying a forward processing algorithm and, as noted, performing backward processing of the input data to derive interim backward navigation solutions for the epochs comprises transforming the input data and applying the forward processing algorithm to the transformed sensor data from the second instant to the first instant. Transforming the input data may involve transforming sensor data. As such, transforming the sensor data may involve transforming accelerometer and gyroscope data. Transforming the sensor data may also involve transforming available sensor data selected from the group consisting of accelerometer, gyroscope, magnetometer, barometer and odometer data.

In one aspect, the input data may include absolute navigational information. The absolute navigation information may be at least one of the group consisting of: (i) a global navigation satellite system (GNSS); (ii) cell-based navigational information; (iii) WiFi-based navigational information; and (iv) other wireless-based navigational information.

In one aspect, the input data may include absolute navigational information and transforming the input data may involve transforming absolute navigational information. Transforming the absolute navigational information may involve transforming any available quantity selected from the group consisting of: (i) absolute position; (ii) absolute velocity; (iii) absolute attitude angles; and (iv) absolute heading angle. Transforming the absolute navigational information may involve transforming any available information selected from the group consisting of: (i) a global navigation satellite: system (GNSS); (ii) cell-based navigational information; (iii) WiFi-based navigational information; and (iv) other wireless-based navigational information.

In one aspect, performing backward processing of the input data to derive interim backward navigation solutions for the epochs may involve applying a backward processing algorithm to the input data without transformation.

In one aspect, multiple quantities of the navigation solution that do not depend on each other from the interim forward and backward navigation solutions may be combined at the same time. The multiple quantities may include heading and misalignment angle.

In one aspect, combining a quantity of the navigation solution may involve weighting quantities derived from forward and backward processing. Weighting the quantities may involve assessing forward and backward accuracy. For example, assessing forward and backward accuracy may be based at least in part on a standard deviation of solution errors. Weighting the quantities derived from forward and backward processing may also involve a linear combination.

In one aspect, an error in the input data may be characterized such that the method includes compensating for the error before performing at least one of the forward and backward processing. In one possible example, a predefined motion pattern of the device may be detected such that the error in the input data is characterized based at least in part on the detected predefined motion period. As a further representative illustration only example, the predefined snot ion pattern may be a static period and the error may be a gyroscope bias. Correspondingly, in the last example, the gyroscope bias may be transformed so that the backward processing operation may be performed using the transformed gyroscope bias.

In one aspect, an anchor point may be identified such that at least one of the first instant and the second incident corresponds to when the device is at the identified anchor point. A plurality of anchor points may be identified such that the first instant and the second instant correspond to when the device is at identified anchor points.

In one aspect, the input data further may include supplemental navigation information for the device obtained from at least one of a barometer, a magnetometer, an odometer, a speedometer and a pedestrian motion mode).

In one aspect, at least one time-based smoothing process may be performed for at least one quantity of the navigation solution. The time-based smoothing process smoothing may be a non-causal process. The time-based smoothing process may be performed for height, latitude, longitude, velocity and/or speed.

In one aspect, smoothing a height quantity of the navigation solution may be performed by obtaining barometer data, obtaining absolute navigation information, determining a bias of the barometer data based at least in part on the absolute navigation information, correcting the barometer data based at least in part on the determined bias, and smoothing the barometer data.

In one aspect, obtaining the input data may be performed locally with respect to the device and the remaining operations may be performed remotely.

In one aspect, obtaining the input data and deriving an interim forward navigation solution may be performed locally with respect to the device and the remaining operations may be performed remotely.

In one aspect, all operations may be performed locally with respect to the device.

As noted, the techniques of this disclosure may be implemented using a device, such as device 200 as described above. In one aspect, the device ma; also have a source of absolute navigation information so that the input data may also include the absolute navigation information. The absolute navigation information may be obtained from at least one of: (i) a global navigation satellite system (GNSS); (ii) cell-based positioning; (iii) WiFi-based positioning; or (iv) other wireless-based positioning.

In one aspect, the sensor assembly includes an accelerometer, and a gyroscope. For example, the sensor assembly may include an accelerometer, a gyroscope, a magnetometer, and a barometer. The sensor assembly may comprise an inertial sensor implemented as a Micro Electro Mechanical System (MEMS).

In one aspect, the device may also have at least one source of supplemental navigation information obtained a barometer, a magnetometer, an odometer, a speedometer and/or a pedestrian motion mode such that the input data also includes the supplemental navigation information.

This disclosure also includes a server for enhancing a navigation solution of a device and a platform through multiple pass smoothing as noted above. In one aspect, the input data received from the device may also include the interim forward navigation solution. Alternatively, the MPS navigation module of the server may be configured to derive the interim forward navigation solution by performing forward processing of the input data.

Further, this disclosure includes a system for providing an enhanced smoothed navigation solution through multiple pass smoothing that includes a device and remote processing resources, such as server, as described above. In one aspect, the device may also have a navigation module to derive the interim forward navigation solution by performing forward processing of the input data such that the input data transmitted by the communications module also includes the interim forward navigation solution. Alternatively, the MPS navigation module of the remote processing resources may be configured to derive the interim forward navigation solution by performing forward processing of the input data.

EXAMPLES

As described above, the techniques of the disclosure involve enhancing navigation solution through multiple pass smoothing. The following examples are provided to illustrate suitable techniques for the performing the operations noted above, but it should be appreciated that these are representative only and that other suitable substitutes may be employed as desired.

Depending on the navigation algorithm employed, one or more transformations may be applied 10 the input data to convert the data from a formal corresponding to beginning at the first instant and ending at the second instant to beginning at the second instant and ending at the first instant for use in backward processing. Different transformations may be applied depending on the nature of the input data. Notably, depending on the embodiment, a portable device such as portable device 100 may have different input information. As described, the input information may include motion sensor data from inertial sensors, such as gyroscopes or accelerometers. The input information may also include absolute navigation information when a source of such information is available and when the portable device is configured to receive it. Still further, the input data may include supplemental navigation information, such as may be obtained from a barometer, a magnetometer, an odometer, a speedometer or user dynamics (e.g., a pedestrian motion model). Any available input data used for forward processing may be transformed as appropriate to allow backward processing by using the forward processing algorithm. Alternatively, as noted above, a backward processing algorithm may be employed that does not necessarily require transformation of some or all of the input data.

With respect to accelerometer data, an initial operation may involve removing gravity components are removed from the measurements. Similarly, any components attributable to rotation of the Earth are removed. Then, the accelerometer data may be negated for each epoch. Following negation, any components removed are restored.

In one embodiment, the gravity components in the body frame (b-frame, i.e., the frame determined by the measurement center and the x-, y-, and z-axes of sensors) may be calculated as indicated in Equation (1), where $g^w = [0\ 0\ g]^y$ is the gravity vector in the navigation frame (n-frame, i.e., the frame determined by the measurement center of sensors and the north, east, and down directions) and g is the local gravity value:

$$g^b = C_n^b g^n \quad (1)$$

$C_b^n$ the direction cosine matrix (DCM), which may be represented by the roll, pitch, and heading angles as indicated in Equation (2), where $\phi$, $\theta$, and $\psi$ are the Euler angles (i.e., the roll, pitch, and heading angles) s• and c• are the shorthand notations of sin(•) and cos(•), respectively.

$$C_b^n = \begin{bmatrix} c\theta c\psi & -c\phi s\psi + s\phi s\theta c\psi & s\phi s\psi + c\phi s\theta c\psi \\ c\theta s\psi & c\phi c\psi + s\phi s\theta s\psi & -s\phi c\psi + c\phi s\theta s\psi \\ -s\theta & s\phi c\theta & c\phi c\theta \end{bmatrix} \quad (2)$$

Therefore, the gravity vector in the b-frame can be represented by Equation (3):

$$g^b = [-gs\theta\ gs\phi c\theta\ gc\phi c\theta]^T \quad (3)$$

The roll and pitch angles can be calculated from accelerometer readings using Equations (4) and (5), respectively, where $f_i(i=x,y,z)$ is the accelerometer-measured specific force along the i-th axis:

$$\phi = \alpha\tan 2(-f_y, -f_z) \quad (4)$$

$$\theta = \alpha\tan 2(f_x, \sqrt{f_y^2 + f_z^2}) \quad (4)$$

The heading may be obtained from the navigation algorithm, or obtained from other sensors such as magnetometers, or set manually.

Next, the specific force measured due to the rotation rate of the Earth may be calculated from Equations (6) and (7), where $f_{cori}^b$ and $f_{cori}^n$ are the b-frame and n-frame specific force measured due to earth rotation rate, respectively, $v^n$ is the platform's velocity, and $\omega_{ie}^n$ and $\omega_{en}^n$ are the Earth rotation rates and the rotation rate caused by the platform motion, respectively:

$$f_{cori}^b = C_n^b f_{cori}^n \quad (6)$$

$$f_{cori}^n = (2\omega_{ie}^n + \omega_{en}^n) \times v^n \quad (7)$$

Therefore, the acceleration of the platform independent of gravity and Earth's rotation may be determined by removing the quantities derived in Equations (1), (6) and (7) as indicated by Equation (8), where $a^n$ is the platform's acceleration and $\tilde{f}^b$ is the forward accelerometer reading vector:

$$a^b = \tilde{f}^b + g^b - f_{cori}^b \quad (8)$$

Assuming that the velocity of the platform is in the order of $10^0 \sim 10^1$ m/s, then $\omega_{en}^n$ is in the order of $10^{-7} \sim 10^{-6}$ rad/s. Also considering that $\omega_{ie}^n$ is in the order of $10^{-5}$ rad/s, $f_{cori}^b$ is in the order of $10^{-5} \sim 10^{-4}$ m/s². As desired, $f_{cori}^b$ may be neglected in Equation (8) when using lower precision accelerometers because it is several orders of magnitude lower than the accelerometer errors in $\tilde{f}^b$. Correspondingly, negating the platform acceleration calculated in Equation (8) and restoring the removed components of Equations (1), (6) and (7) back, the backward accelerometer reading vector may be expressed as Equation (9):

$$\tilde{f}_{back}^b = -\tilde{f}^b - 2g^b + 2f_{cori}^b \quad (9)$$

Similarly, with respect to gyroscope data, a suitable transformation may include removing the components corresponding to the rotation of the Earth, negating the measurements for each epoch, and restoring the removed components. Gravity does not impact the gyroscope, so it is not necessary to remove a gravity component. For example, rotation rate of the Earth in the b-frame may be calculated as indicated by Equation (10):

$$\omega_{ie}^b = C_n^b \omega_{ie}^n \quad (10)$$

In a similar manner as the accelerometer transformation, the backward gyroscope reading vector may be calculated using Equation (11), where $\tilde{\omega}_{back}^b$ and $\tilde{\omega}^b$ are the backward and forward gyroscope reading vectors, respectively:

$$\tilde{\omega}_{back}^b = -\tilde{\omega}^b + 2\omega_{ie}^b \quad (11)$$

For lower precision gyroscopes, the magnitude of the earth rotation rate is several levels lower than those of sensor errors and the term $2\omega_{ie}^n$ may be neglected, if desired.

With respect to magnetometer data readings, a suitable routine for transforming the data may include calculating the magnetic field components in the n-frame according to Equation (12), where $m^n$ and $m^b$ are the magnetic field vector in the n-frame and b-frame, respectively, and the sign $(\bullet)^T$ represents the transposition of a matrix:

$$m^n = (C_n^b)^T m^b \quad (12)$$

The horizontal magnetic field components may be negated while maintaining the sign of the vertical component as indicated in Equation (13) for the matrix $m^n = [m_N\ m_E\ m_D]^T$, where $m_t^n$ is the transformed magnetic field vector in the n-frame:

$$m_t^n = [-m_n\ -m_E\ m_D]^T \quad (13)$$

Correspondingly, the transformed magnetic reading vector $m_t^b$ may be calculated as indicated by Equation (14):

$$m_t^b = C_n^b m_t^n \quad (14)$$

Further, if the magnetometer-derived azimuth is used, the azimuth angle may be transformed by adding 180 degrees.

With respect to absolute navigation information, suitable transformations may also be applied prior to backward processing. For example, position determinations such as from GNSS or WiFi, may be kept the same. Further, velocity components along North and East may be negated, but the vertical component may be kept the same. Any optionally available platform speed reading derived from odometer or pedestrian motion models or any other sources may also be kept the same. If velocity readings are available instead of speed, the horizontal components are negated in a similar manner as velocity. Additionally, barometer readings if available may be kept the same.

For all input data, the transformed data will be used as though beginning at the second instant and ending at the first instant when backward processing. Correspondingly, any timestamps of the transformed data may be inverted. As an illustration, the timestamp according to the k-th epoch may be determined as indicated in Equation (15), where $t'_k$ and $t_k$ are the timestamps at the k-th epoch of the backward and forward data and $t_{es}$ and $t_{ee}$ are the timestamps of the first and the second instant, respectively:

$$t'_k = t_{es} + t_{ee} - t_k \quad (15)$$

To keep the timestamps from different of sensors in alignment, the same $t_{es}$ and $t_{ee}$ values may be used for inverting the time-stamps of all sensors.

As noted above, the transformed input data may be used when performing backward processing operations, such as those corresponding to 310 and/or 322 of FIG. 3. The backward navigation solution may be obtained by using the transformed input data and the forward navigation algorithm. In other embodiments, the forward input data may be used with a separate backward navigation algorithm. Thus, backward processing may include the input of data, transformed or not as appropriate, the setting of parameters, compensation for sensor error and other aspects.

For example, backward processing corresponding to 310 may involve employing transformed gyroscope and accelerometer data, as well as GNSS, WiFi, magnetometer, barometer, other measurements or updates, or other sources of input data if available.

During backward processing, the input data is processed from the second instant to the first instant. As such, initial navigation states (i.e., position, velocity, and attitude) may be set according to the navigation states at the last epoch of the smoothed data. If GNSS, WiFi or other measurements or updates are available, the initial navigation states may be set according to the measurement or update. Otherwise, the initial navigation states may be set manually or set based on the forward navigation solution. If the forward navigation solution at one epoch (e.g., the second instant), or the combination (e.g., averaging) of the forward navigation solution during a time period, is used to set the initial navigation states, the position may be kept the same. As described above, velocity components along North and East are negated, but the vertical component may be kept the same. Further, horizontal altitudes may be kept the same, and the heading angle may be transformed by adding 180 degrees to it. The horizontal altitude may also be calculated from the accelerometer data using Equation (4).

Initial values of the gyroscope and accelerometer biases for the backward process may be set by negating the values of forward biases as indicated by Equation (16), where b' represents the initial values of the backward gyroscope or accelerometer biases and b represents the corresponding forward biases:

$$b' = -b \quad (16)$$

The forward bias may be obtained from the forward navigation solution, be set manually, or by using other methods. In one aspect, gyroscope bias may be determined during a detected period of motionlessness of sufficient duration. Other patterns of motion may be used to determine other characteristics of the sensors. The initial values of the backward gyroscope and accelerometer scale factor errors and non-orthogonalities may be kept the same as the forward.

Depending on navigation algorithm being employed, other strategies may be used in the backward process. For example, the backward use cases may be changed to be the same as those in the forward ones to make the forward and backward sensor axes consistent with one another.

One or more quantities of the navigation solution may be smoothed by combining values obtained from the navigation solutions derived from forward and backward processing, as indicated by 314 and 326. Combining the forward and backward results may involve setting an appropriate weight for each value. For example, the weights used may be based on changes of forward and backward navigation accuracy, which in turn may be determined by performing a standard deviation analysis of errors of the solutions. Alternatively or in addition, linear combination techniques may also be employed.

The following example is in the context of combining heading and misalignment in 314 to smooth these quantities, such that one or more quantities that art combined in 326 to provide the enhanced smoothed navigation solution, such as position, velocity and/or attitude, are based at least in part on the use of the smoothed heading and misalignment. However, these principles may be extended to any quantities that may be involved in a navigation solution. Correspondingly, misalignment values from the interim forward and backward navigation solutions of 304 and 312, respectively, may be combined based on changes of forward and backward navigation accuracy (i.e., standard deviation of solution errors). The following materials discuss changes of the north position accuracy and may be modified as appropriate. The forward or backward accuracy change at the k-th epoch may be calculated from Equation (17), where $\sigma_{N,k+1}$ and $\sigma_{N,k}$ are the north position accuracy at the epochs (k+1) and k, respectively and $\delta_{N,k}$ is the accuracy change:

$$\delta_{N,k} = \sigma_{N,k+1} - \sigma_{N,k} \quad (17)$$

Additionally, the accuracy changes at the k-th epoch may be combined with those at adjacent epochs to obtain a time-based smoothed accuracy change according to Equation (18), where $\bar{\delta}_k$ is the smoothed accuracy change at the k-th epoch, n1 and n2 are the numbers of the epochs that are used for smoothing before and after the k-th epoch:

$$\bar{\delta}_k = \left( \sum_{i=k-n1}^{k+n2} \delta_{N,i} \right) \bigg/ (n1 + n2 + 1) \quad (18)$$

By using the calculated forward and backward accuracy changes, $\bar{\delta}_{k,f}$ and $\bar{\delta}_{k,b}$, the relative weight $\zeta_{m,k}$ may be determined using Equation (19):

$$\zeta_{m,k} = \begin{cases} 1, & \text{if } (\bar{\delta}_{k,f} > TH_{high} \text{ and } \bar{\delta}_{k,b} \leq TH_{high}) \text{ or} \\ & (\bar{\delta}_{k,f} \leq TH_{low} \text{ and } \bar{\delta}_{k,b} > TH_{low}); \\ 0, & \text{if } (\bar{\delta}_{k,f} \leq TH_{high} \text{ and } \bar{\delta}_{k,b} > TH_{high}) \text{ or} \\ & (\bar{\delta}_{k,f} > TH_{low} \text{ and } \bar{\delta}_{k,b} \leq TH_{low}); \\ \bar{\delta}_{k,f} / (\bar{\delta}_{k,f} + \bar{\delta}_{k,b}), & \text{in other cases} \end{cases} \quad (19)$$

A threshold may be used to avoid the potential numerical problem when calculating $\bar{\delta}_{k,f}/(\bar{\delta}_{k,f}+\bar{\delta}_{k,b})$: if $\bar{\delta}_{k,f} < TH_{min}$, $\bar{\delta}_{k,f} = TH_{min}$; and the same approach may be used for $\bar{\delta}_{k,b}$.

Next, the smoothed misalignment may be calculated using Equation (20), where $m_{k,sm}$, $m_{k,f}$ and $m_{k,b}$ are the smoothed, forward, and backward misalignment at the k-th epoch, respectively:

$$m_{k,sm} = m_{k,f} + \zeta_{m,k}(m_{k,b} - m_{k,f}) \quad (20)$$

As desired, the value $\Delta m_k = m_{k,b} - m_{k,f}$ may be centralized prior to performing the calculation of Equation (20) by applying Equation (21):

$$\Delta m_k = \begin{cases} \Delta m_k - 360°, & \text{if } \Delta m_k > 180°; \\ \Delta m_k + 360°, & \text{if } \Delta m_k < 180°; \\ \Delta m_k, & \text{in other cases} \end{cases} \quad (21)$$

As noted, combining a quantity using values from forward and backward navigation solutions may involve a linear combination. In the context of misalignment, the combined, smoothed misalignment is represented by Equation (22), where N is the number of the data epochs used in the smoothing:

$$m_{k,sm} = m_{k,f} + f/N \cdot \Delta m_k \quad (22)$$

Likewise, forward and backward heading angles may be combined using similar strategies as describe with regard to misalignment. When a linear combination approach is used, the smoothed heading is represented by Equation (23), where N is the number of the data epochs used in the smoothing, $\psi_{k,sm}$, $\psi_{k,f}$ and $\psi_{k,b}$ are the smoothed, forward, and backward heading angles and $\Delta\psi_k = \psi_{k,b} - \psi_{k,f}$:

$$\psi_{k,sm} = \psi_{k,f} + k/N \cdot \Delta\psi_k \quad (23)$$

Again, the calculated $\Delta\psi_k$ may be centralized prior to applying Equation (23):

The accuracy of the smoothed heading may be calculated through the linear combination of the forward and backward heading accuracy according to Equation (24), where $\sigma_{\psi,k,sm}$, $\sigma_{\psi,k,f}$ and $\sigma_{\psi,k,b}$ are the accuracy of the smoothed, forward, and backward heading:

$$\sigma_{\psi,k,sm} = \sigma_{\psi,k,f} + k/N \cdot (\sigma_{\psi,k,b} - \sigma_{\psi,k,f}) \quad (24)$$

Appropriate adjustments may be made to this equation depending on the navigation algorithm being employed. For example, a scale factor $s_{\psi,b2f}$ may be needed to tune the backward heading accuracy to the same level of the forward one, as indicated by Equation (25):

$$\sigma_{\psi,k,sm} = (1 - k/N)\sigma_{\psi,k,f} + s_{\psi,b2f} \cdot k/N \cdot \sigma_{\psi,k,b} \quad (25)$$

Since the smoothed heading will be more accurate than both the forward and backward ones, a scale factor $s_\psi$ ($s_\psi \leq 1$) may be used to scale the smoothed heading accuracy. Accordingly, the smoothed heading accuracy may be calculated using Equation (26):

$$\sigma_{\psi,k,sm} = s_\psi \cdot ((1 - k/N)\sigma_{\psi,k,f} + s_{\psi,b2f} \cdot k/N \cdot \sigma_{\psi,k,b}) \quad (26)$$

The smoothed heading and misalignment values may then be used to perform additional forward and backward processing passes, such as in a 318 and 322, resulting in enhanced interim navigation solutions that may be combined in 326 to provide the enhanced smoothed navigation solution of 328. As necessary, the quantity or quantities of the navigation solution that were combined in 314 may be transformed as appropriate using the techniques described above prior to the next backward processing pass. For example, the smoothed heading may be transformed by adding 180 degrees.

Once more, the following is in the context of employing smoothed heading and misalignment to provide the enhanced smoothed navigation solution, such as position, velocity and/or attitude, but these principles may be extended to any quantities that may be involved in a navigation solution. The combination of the enhanced interim navigation solutions may involve smoothing any suitable quantity of the navigation solution.

For example, position may be combined based on the position accuracy according to Equations (27) and (28), where $lat_{k,sm}$, $lat_{k,f}$ and $lat_{k,b}$ are the smoothed, forward, and backward latitude solutions, respectively, and $\sigma_{k,f}$ and $\sigma_{k,b}$ are the forward and backward north position accuracy, respectively:

$$lat_{k,sm} = lat_{k,f} + \zeta_{lat,k}(lat_{k,b} - lat_{k,f}) \quad (27)$$

$$\zeta_{lat,k} = \sigma_{k,f}/(\sigma_{k,f} + \sigma_{k,b}) \quad (28)$$

Similarly, the smoothed longitude may be calculated by combining the forward and backward longitude results based on the east position accuracy. Further the smoothed height may be obtained by combining the forward and backward height according to the vertical position accuracy.

Velocity and horizontal attitude angles may be combined by averaging the forward and backward solutions. Before combination, the horizontal components of the backward velocity may be calculated using Equations (29) and (30), where $vn'_{k,b}$ and $ve'_{k,b}$ are the north and east velocity used for combination, respectively, and $vn_{k,b}$ and $ve_{k,b}$ are the north and east velocity from the backward solution, respectively:

$$vn'_{k,b} = -vn_{k,b} \quad (29)$$

$$ve'_{k,b} = -ve_{k,b} \quad (30)$$

The smoothed north velocity may be calculated using Equation (31), where $vn_{k,sm}$ and $vn_{k,f}$ are the smoothed and forward north velocity, respectively:

$$vn_{k,sm} = (vn_{k,f} + vn'_{k,b})/2 \quad (31)$$

Similarly, the smoothed velocity in the east and vertical directions and the smoothed horizontal attitude angles are calculated by averaging corresponding forward and backward solutions.

A suitable approach for calculating the accuracy of smoothed horizontal position may be similar to that used for heading. The accuracy of the smoothed position in north is given by Equation (32), where $\sigma_{N,k,sm}$, $\sigma_{N,k,f}$ and $\sigma_{N,k,b}$ are the accuracy of the smoothed, forward, and backward north position at the k-th epoch, respectively, and $s_{N,b2f}$ and $s_N$ are scale factors:

$$\sigma_{N,k,sm} = s_N \cdot ((1 - k/N)\sigma_{N,k,f} + s_{N,b2f} \cdot k/N \cdot \sigma_{N,k,b}) \quad (32)$$

Similarly, the accuracy of the smoothed east position may be obtained by employing an equivalent process.

The accuracy of the smoothed height, velocities, and horizontal attitude angles may be calculated by averaging the corresponding forward and backward accuracy. For instance, the accuracy of the smoothed north velocity may be calculated using Equation (33), where $\sigma_{vn,k,sm}$, $\sigma_{vn,k,f}$ and $\sigma_{vn,k,b}$ are the of the smoothed, forward, and backward north velocity, respectively;

$$\sigma_{vn,k,sm} = (\sigma_{vn,k,f} + \sigma_{vn,k,b})/2 \quad (33)$$

Similarly, the accuracy of the smoothed velocity in the east and vertical directions, horizontal attitude angles, and height may be calculated by averaging the corresponding forward and backward accuracies.

Optionally, any suitable technique may be employed to characterize an error or errors in the input data. Correspondingly, the characterization of the error may be used to compensate the input data, before performing either or both of the forward and backward processing operations. Notably, the input data may be compensated before transformation for use in backward processing.

As an illustration of one embodiment, a predefined motion pattern of the device may be detected and used to characterize the error in the input data. The detected predefined motion pattern may facilitate estimating the input data error. Subsequently, the error may be compensated before performing either or both forward and backward processing.

For example, the predefined motion pattern may be a static period having sufficient length, so that a gyroscope bias may be characterized. A suitable routine may involve detecting one or more static periods in the input trajectory. The duration of any detected static period may then be compared to a threshold to ensure the device was motionless for a sufficient length of time. If the threshold is exceeded, gyroscope bias may be calculated, such as by averaging or weighted averaging of the gyroscope data during the static period. The calculated bias of the gyroscope may then be used to compensate the input data. As desired, the gyroscope bias may be transformed and used when performing backward processing. Determination of gyroscope bias is representative of the type of error compensation that may be performed and any number of corrections may be made to the input data.

If available, one or more anchor points may be integrated with the MPS techniques of this disclosure. An anchor point may be identified that is associated with a known position or other quantity of the navigation solution. In some embodiments, an anchor point may be used to establish either or both the start and end of a given trajectory of the portable device. As such, the first and/or the second instant may correspond to when the portable device is at an identified anchor point. It may also be desirable to identify multiple anchor points to allow the construction of overlapping trajectories. The initial position of the forward and backward algorithms may be obtained from either the start and end points of trajectory or of the task time period (i.e., the time period during which the MPS process is used), or anchor points. The use of anchor points is optional. When the task time period is lengthy, anchor points may be used to break the trajectory in shorter sections, by reducing each MPS task time period the navigation/positioning performance may be improved. In one aspect, the techniques of this disclosure may use starting and ending anchor points established by discontinuous absolute navigation information availability, with bridging trajectories determined by the MPS process. For example, the absolute navigation information source may be operated in a duty cycle mode and the selection of anchor points may be coordinated to establish the first and second instants during periods when the source of absolute navigation information is active. However, any suitable method may be employed to identify anchor points. For example, the user may manually insert the position and/or anchor point type.

Alternatively or in addition, an anchor point may be identified automatically based on some absolute navigational information such as GNSS or Wi-Fi, i.e. when there is sufficient absolute navigational information. As one representative example, an anchor points may be selected based on a predefined duration between one GNSS solution and next available GNSS solution after a certain gap. Further, when a gap occurs in the GNSS solution, initial fixes following reacquisition may be associated with high standard deviation. As desired, such initial fixes may be rejected from the input data and employed when the accuracy settles as indicated by the standard deviation falling below a threshold. As another example, it may be determined that absolute navigation information may be unreliable even if available, such as may be caused by difficult reception conditions (e.g., an "urban canyon" resulting from adjacent tall buildings).

Further, a segment of absolute navigation information may also be rejected on criteria other than standard deviation. For example, user dynamics in the form of a human motion constraint may be employed. To illustrate, distance between consecutive GNSS segments may be calculated and compared against another distance calculated that depends on a user motion mode (walking or running) and the user's speed, as obtained from the MPS process or another alternative solution. In one aspect, human maximum speed may be assumed depending on the determined motion mode. A walking user may be expected to have a speed of approximately 2 m/s and a running user may be expected to have a speed of approximately 7 m/s. When multiple motion modes exist, a weighted average may be employed, for example, if 20% of the segment the motion mode was running, while 80% was walking, using same values as in the previous example, the final speed used in calculating the constraining distance may be 0.8*2+0.2*3 m/s for the whole GNSS segment. If the distance derived from the consecutive GNSS solutions is incompatible with the distance determined based on the constraint, the GNSS information may be excluded from the input data.

For example, the absolute navigation information source may be operated in a duty cycle mode as noted. Although such implementations conserve power, they result in gaps in the navigation solutions provided by the absolute navigation information. The MPS techniques of this disclosure may be used to bridge such gaps. Further, selected absolute navigation information may be excluded from the MPS process to improve performance based on the criteria described above or in other suitable conditions.

In the above discussion, smoothing is described in the context of combining values for a quantity of the navigation solution resulting from forward and backward processing. As desired, a further time-based smoothing technique that reduces the change in value for a quantity of the navigation solutions between different times. Such smoothing techniques may be non-causal as they can utilize information from future periods as well as past periods for any given epoch. The quantity derived from time-based smoothing may be used in place of a determination resulting from the MPS process or to adjust the MPS determination as desired. For example, a time-based smoothing process may be used to smooth height data obtained from a barometer. If available, absolute navigation information may be used to determine an offset of the barometer that may be used to compensate the smoothed solution. Likewise, a time-based smoothing process may also be employed for quantities including position, velocity and speed.

Another optional smoothing operation that may be performed on height employs absolute navigation information and/or motion sensor data. Height information may be determined from a barometer, but the data may be degraded by noise and by bias. Absolute navigation information, such as for example from a GNSS system, may be used to estimate the offset or bias of the barometer data. Further, the noise may be reduced by smoothing the barometer data or by filtering the barometer data using or integrating the barometer data with other motion sensor data, such as accelerometer and/or gyroscope information, to smooth the output. This latter described filtering or integration may optionally also integrate with absolute navigation information as well, in addition to the offset/bias correction from absolute navigation information. Thus, height smoothing may depend on barometer data only, may depend on barometer and accelerometer data, may depend on barometer, accelerometer and gyroscope data, and optionally with any of these may or may not use the absolute navigation information for integration and smoothing, in addition to bias determination and correction as described above.

To help illustrate benefits of the techniques of this disclosure, field tests were performed to evaluate the performance of enhancing a navigation solution through multiple pass smoothing. The results were obtained during walking trajectories to provide a representative demonstration of the MPS techniques, which may also be used for any other suitable application, including running, cycling, or locomotion in a vehicle or in any type of vessel. The walking field tests were conducted under a variety of use cases, including handheld, on ear, dangling, and in a pants pocket to help demonstrate the performance of the MPS process. For each use case, three tests with different motions were conducted. Each test consisted of three time periods: during the first and third time periods, the user kept walking and the phone was held horizontally by hand with a 0 degree misalignment (i.e., the angle between the north direction and the x-axis in the b-frame); during the intervening second time period, the user walked with the phone in the specified use case. Therefore, in each test, the use case changed twice. Since changing the use case is one of the most challenging issues in pedestrian navigation applications, these tests were conducted under conditions that may result in significant divergence of sensor-based navigation solutions and validate the benefits of the MPS process. The test time periods were relatively short, approximately 200 seconds or less, so no intermediate anchor point were employed.

The results of the three handheld use case tests are depicted in FIGS. 4-6. During the second time period, the user held the phone horizontally at a misalignment angle of 0 degrees in FIG. 4 (no change in misalignment angle), at a misalignment angle of −90 degrees in FIG. 5 and at a misalignment angle of +90 degrees in FIG. 6.

Figure 4A:
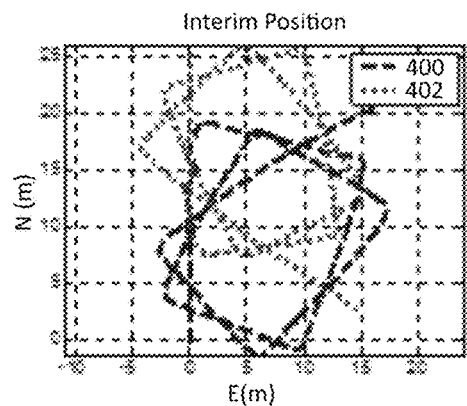
FIGS. 4A-D depict results for multiple pass smoothing of a navigation solution for a portable device in a handheld use case including a first misalignment angle according to an embodiment.
Figure 4B:
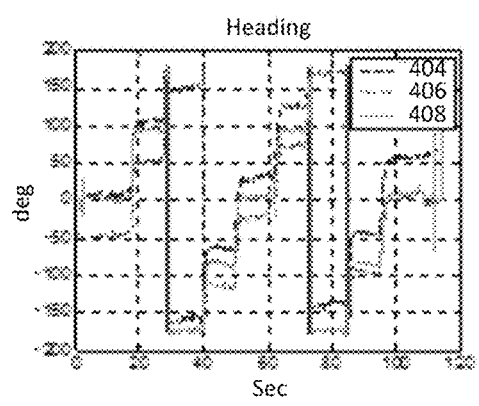
Figure 4C:
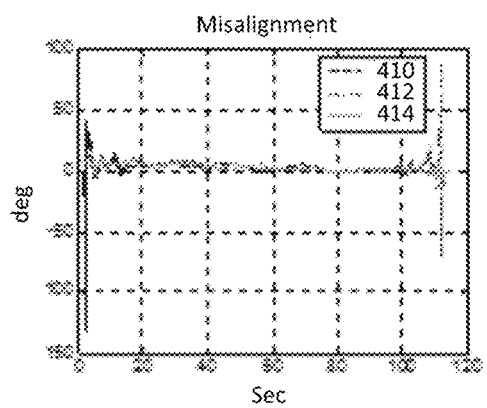
Figure 4D:
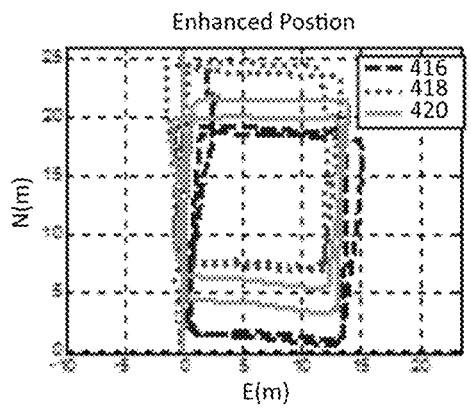

Specifically, FIG. 4A shows the position from the interim forward navigation solution as trace 400 and from the interim backward navigation solution as trace 402; FIG. 4B shows the heading from the interim forward navigation solution as trace 404, from the interim backward navigation solution as trace 406, and the smoothed heading resulting from combining the interim forward and backward navigation solutions as trace 408; FIG. 4C shows the misalignment angle from the interim forward navigation solution as trace 410, from the interim backward navigation solution as trace 412, and the smoothed misalignment angle resulting from combining the interim forward and backward navigation solutions as trace 414; and FIG. 4D shows the position from the established interim forward navigation solution as trace 416, from the enhanced interim backward navigation solution as trace 418, and the smoothed position resulting from combining the enhanced interim forward and backward navigation solutions as trace 420.

Figure 5A:
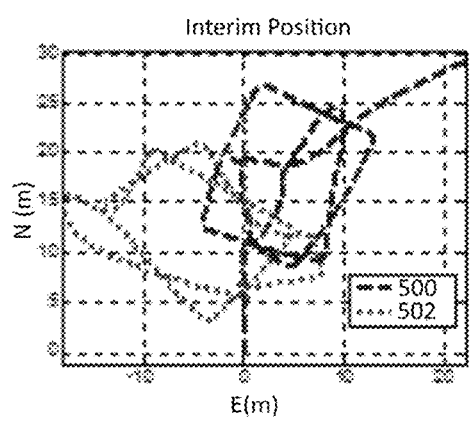
FIGS. 5A-D depict results for multiple pass smoothing of a navigation solution for a portable device in a handheld use case including a second misalignment angle according to an embodiment.
Figure 5B:
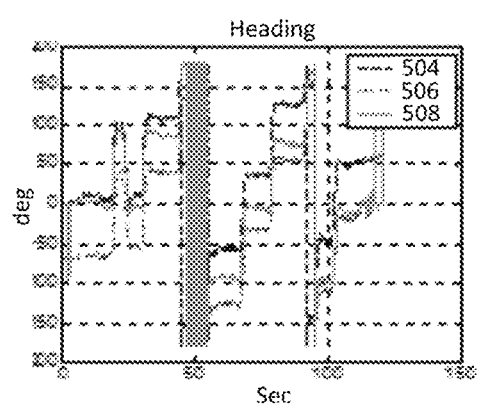
Figure 5C:
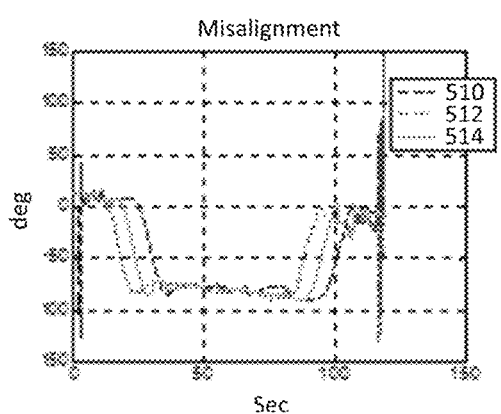
Figure 5D:
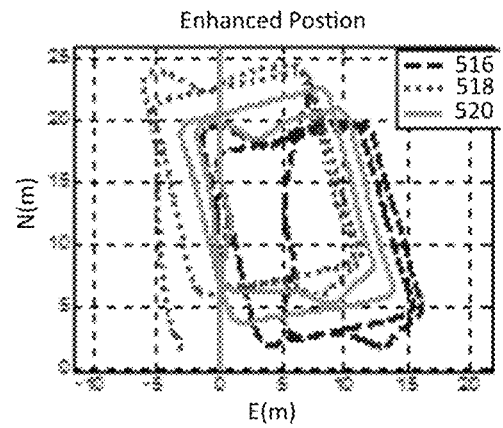

Similarly, FIG. 5A shows the position from the interim forward navigation solution as trace 500 and from the interim backward navigation solution as trace 502; FIG. 5B shows the heading from the interim forward navigation solution as trace 504, from the interim backward navigation solution as trace 506, and the smoothed heading resulting from combining the interim forward and backward navigation solutions as trace 508; FIG. 5C shows the misalignment angle from the interim forward navigation solution as trace 510, from the interim backward navigation solution as trace 512, and the smoothed misalignment angle resulting from combining the interim forward and backward navigation solutions as trace 514; and FIG. 5D shows the position from the enhanced interim forward navigation solution as trace 516, from the enhanced interim backward navigation solution as trace 518, and the smoothed position resulting from combining the enhanced interim forward and backward navigation solutions as trace 520.

Figure 6A:
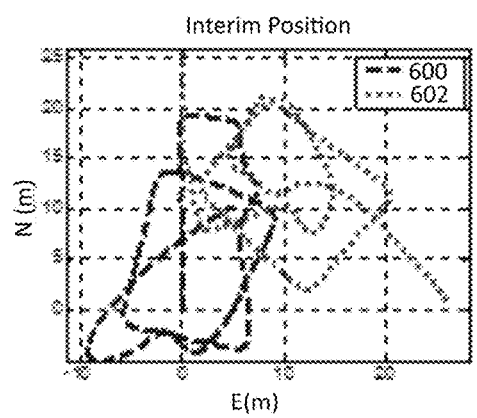
FIGS. 6A-D depict results for multiple pass smoothing of a navigation solution for a portable device in a handheld use case including a third misalignment angle according to an embodiment.
Figure 6B:
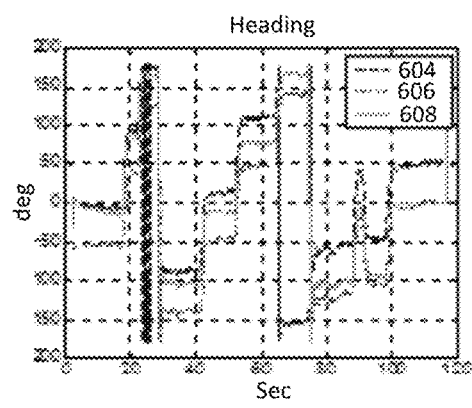
Figure 6C:
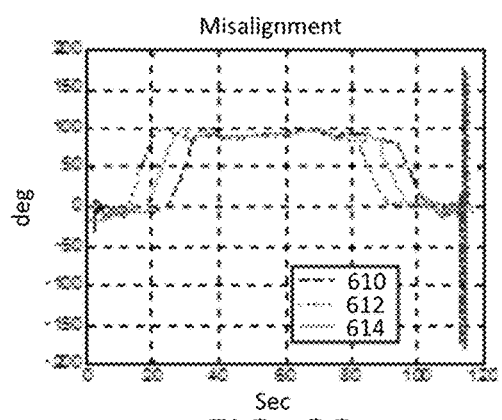
Figure 6D:
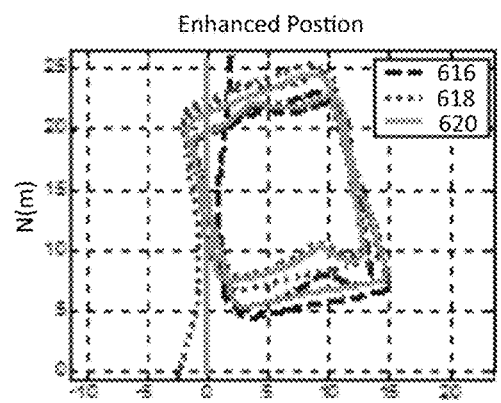

Further, FIG. 6A shows the position from the interim forward navigation solution as trace 600 and from the interim backward navigation solution trace 602; FIG. 6B shows the heading from the interim forward navigation solution as trace 604, from the interim backward navigation solution as trace 606, and the smoothed heading resulting from combining the interim forward and backward navigation solutions as trace 608; FIG. 6C shows the misalignment angle from the interim forward navigation solution as trace 610, from the interim backward navigation solution as trace 612, and the smoothed misalignment angle resulting from combining the interim forward and backward navigation solutions as trace 614; and FIG. 6D shows the position from the enhanced interim forward navigation solution as trace 616, from the enhanced interim backward navigation solution as trace 618, and the smoothed position resulting from combining the enhanced interim forward and backward navigation solutions as trace 620.

The results for the on ear tests are depicted in FIGS. 7-9. During the intervening second time periods, the phone was placed close to the ear naturally by the right hand to provide the results shown in FIG. 7, the phone was placed close to the ear vertically by the right hand to provide the results shown in FIG. 8 and the phone was placed close to the ear horizontally by the left hand to provide the results shown in FIG. 9.

Figure 7A:
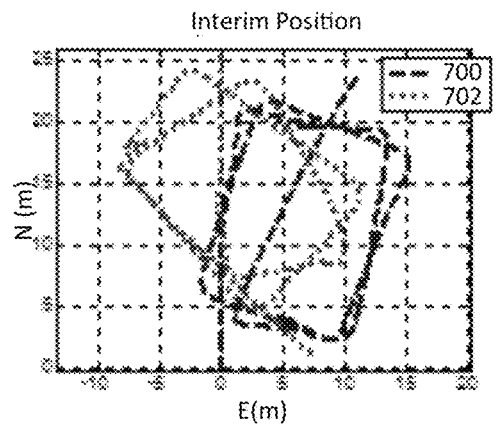
FIGS. 7A-D depict results for multiple pass smoothing of a navigation solution for a portable device in an on ear use case including a first orientation according to an embodiment.
Figure 7B:
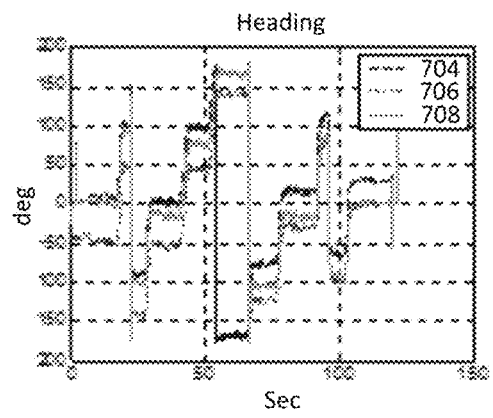
Figure 7C:
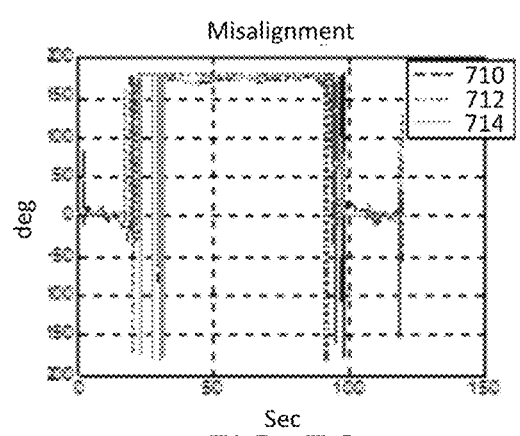
Figure 7D:
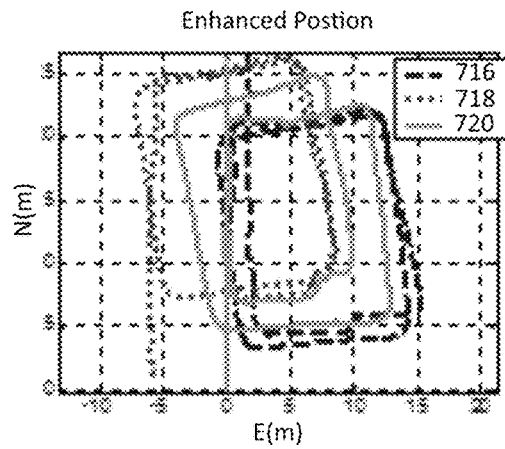

Specifically, FIG. 7A shows the position from the interim forward navigation solution as trace 700 and from the interim backward navigation solution as trace 702; FIG. 7B shows the heading from the interim forward navigation solution as trace 704, from the interim backward navigation solution as trace 706, and the smoothed heading resulting from combining the interim forward and backward navigation solutions as trace 708; FIG. 7C shows the misalignment angle from the interim forward navigation solution as trace 710, from the interim backward navigation solution as trace 712, and the smoothed misalignment angle resulting from combining the interim forward and backward navigation solutions as trace 714; and FIG. 7D shows the position from the enhanced interim forward navigation solution as trace 716, from the enhanced interim backward navigation solution as trace 718, and the smoothed position resulting from combining the enhanced interim forward and backward navigation solutions as trace 720.

Figure 8A:
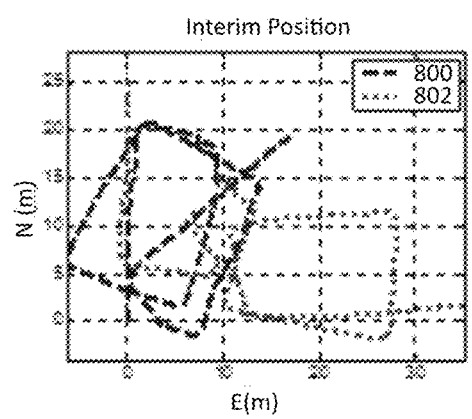
FIGS. 8A-D depict results for multiple pass smoothing of a navigation solution for a portable device in an on car use case including a second orientation according to an embodiment.
Figure 8B:
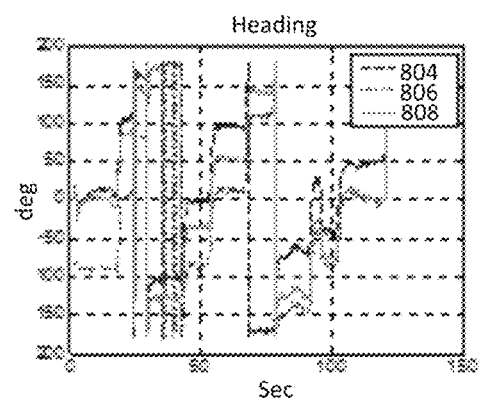
Figure 8C:
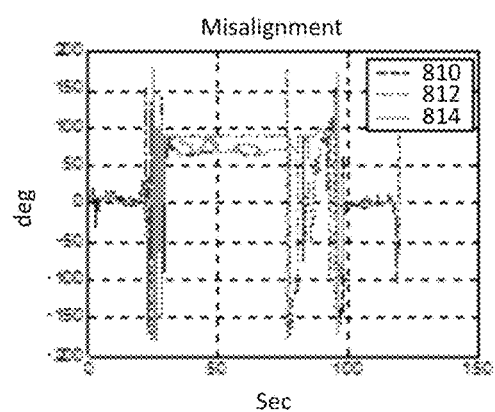
Figure 8D:
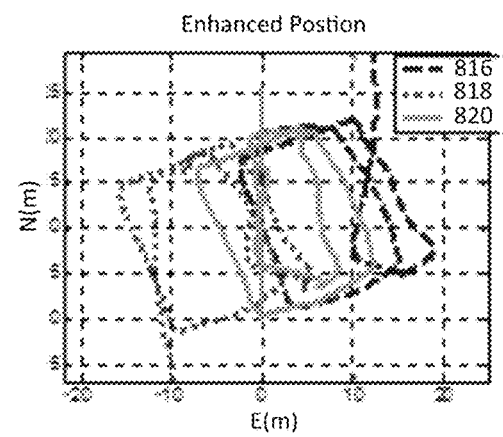

Similarly, FIG. 8A shows the position from the interim forward navigation solution as trace 800 and from the interim backward navigation solution as trace 802; FIG. 8B shows the heading from the interim forward navigation solution as trace 804, from the interim backward navigation solution as trace 806, and the smoothed heading resulting from combining the interim forward and backward navigation solutions as trace 808; FIG. 8C shows the misalignment angle from the interim forward navigation solution as trace 810, from the interim backward navigation solution as trace 812, and the smoothed misalignment angle resulting from combining the interim forward and backward navigation solutions as trace 814; and FIG. 8D shows the position from the enhanced interim forward navigation solution as trace 816, from the enhanced interim backward navigation solution as trace 818, and the smoothed position resulting from combining the enhanced interim forward and backward navigation solutions as trace 820.

Figure 9A:
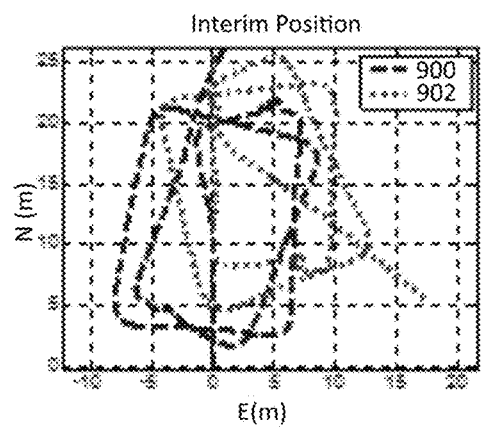
FIGS. 9A-B depict results for multiple pass smoothing of a navigation solution for a portable device in an on ear use case including a third orientation according to an embodiment.
Figure 9B:
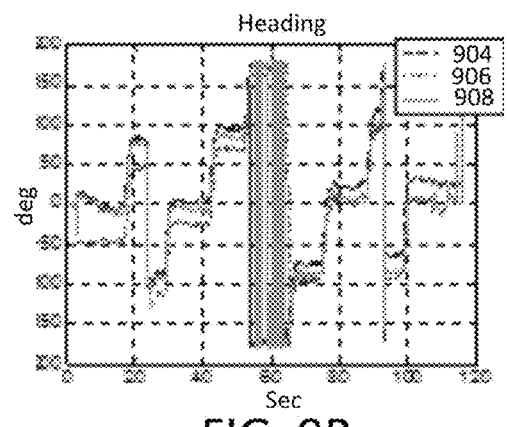
Figure 9C:
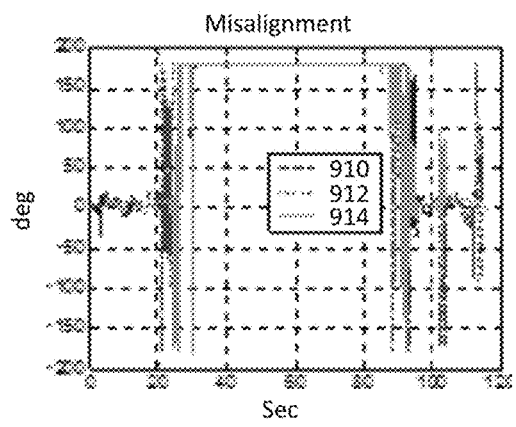
Figure 9D:
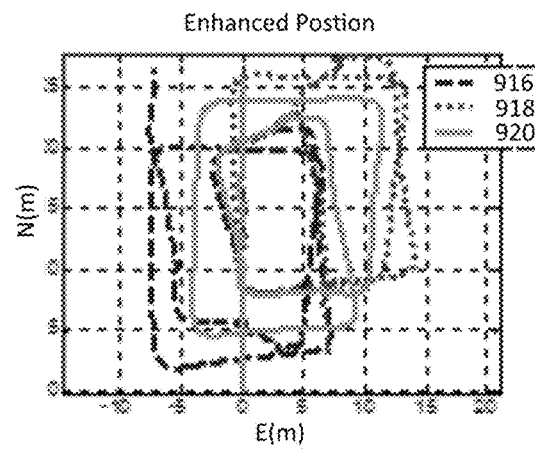

Further, FIG. 9A shows the position from the interim forward navigation solution as trace 900 and from the interim backward navigation solution as trace 902; FIG. 9B shows the heading from the interim forward navigation solution as trace 904, from the interim backward navigation solution as trace 906, and the smoothed heading resulting from combining the interim forward and backward navigation solutions as trace 908; FIG. 9C shows the misalignment angle from the interim forward navigation solution as trace 910, from the interim backward navigation solution as trace 912, and the smoothed misalignment angle resulting from combining the interim forward and backward navigation solutions as trace 914; and FIG. 9D shows the position from the enhanced interim forward navigation solution as trace 916, from the enhanced interim backward navigation solution as trace 918, and the smoothed position resulting from combining the enhanced interim forward and backward navigation solutions as trace 920.

The results for the dangling tests are depicted in FIGS. 10-12. During the intervening second time periods, the phone was dangling with the speaker forward and the screen outside by the right hand to provide the results shown in FIG. 10, the phone was dangling with the speaker forward and the screen inside by the left hand to provide the results shown in FIG. 11 and the phone was dangling with the speaker backward and the screen inside by the left hand to provide the results shown in FIG. 12.

Figure 10A:
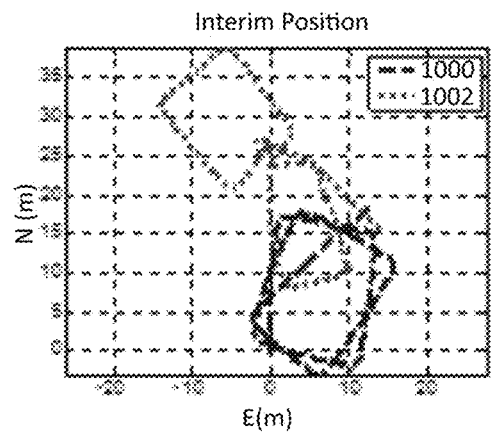
FIGS. 10A-D depict results for multiple pass smoothing of a navigation solution for a portable device in a dangling use case including a first orientation according to an embodiment.
Figure 10B:
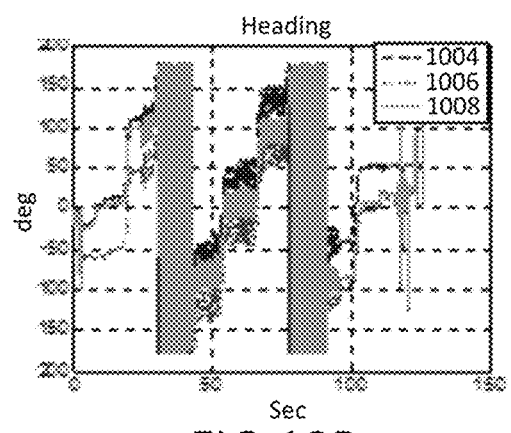
Figure 10C:
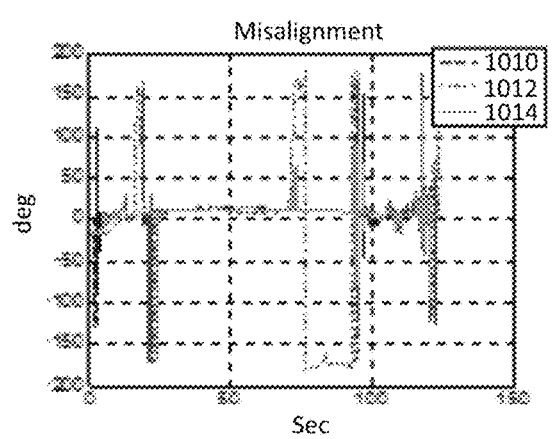
Figure 10D:
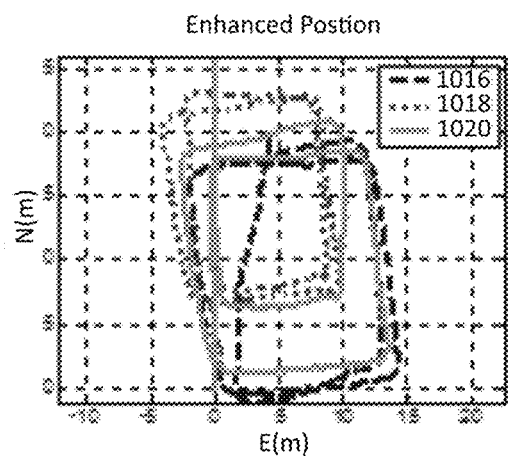

Specifically, FIG. 10A shows the position from the interim forward navigation solution as trace 1000 and from the interim backward navigation solution as trace 1002; FIG. 10B shows the heading from the interim forward navigation solution as trace 1004, from the interim backward navigation solution as trace 1005, and the smoothed heading resulting from combining the interim forward and backward navigation solutions as trace 1008; FIG. 10C shows the misalignment angle from the interim forward navigation solution as trace 1010, from the interim backward navigation solution as trace 1012, and the smoothed misalignment angle resulting from combining the interim forward and backward navigation solutions as trace 1014; and FIG. 10D shows the position from the enhanced interim forward navigation solution as trace 1016, from the enhanced interim backward navigation solution as trace 1018, and the smoothed position resulting from combining the enhanced interim forward and backward navigation solutions as trace 1020.

Figure 11A:
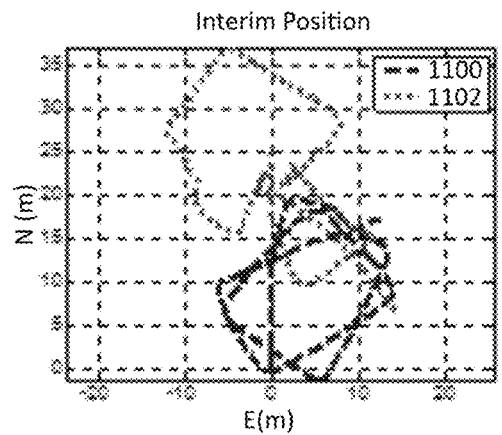
FIGS. 11A-D depict results for multiple pass smoothing of a navigation solution for a portable device in a dangling use case including a second orientation according to an embodiment.
Figure 11B:
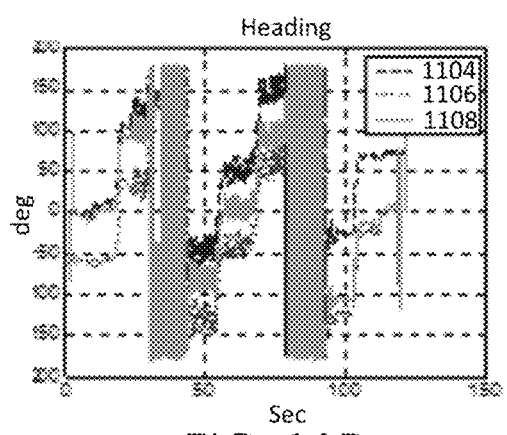
Figure 11C:
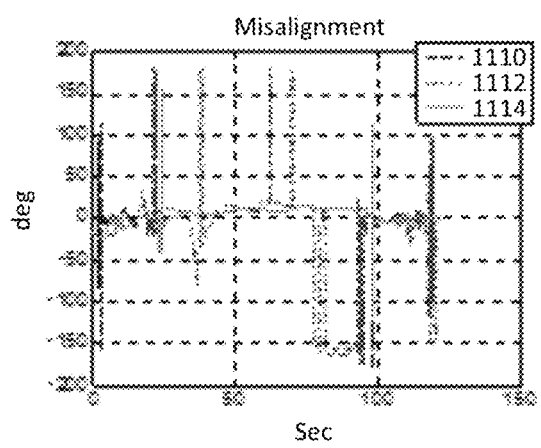
Figure 11D:
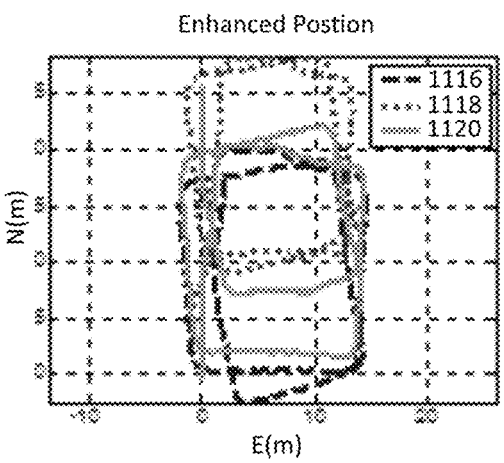

Similarly, FIG. 11A shows the position from the interim forward navigation solution as trace 1100 and from the interim backward navigation solution as trace 1102; FIG. 11B shows the heading from the interim forward navigation solution as trace 1104, from the interim backward navigation solution as trace 1106, and the smoothed heading resulting from combining the interim forward and backward navigation solutions as trace 1108; FIG. 11C shows the misalignment angle from the interim forward navigation solution as trace 1110, from the interim backward navigation solution as trace 1112, and the smoothed misalignment angle resulting from combining the interim forward and backward navigation solutions as trace 1114; and FIG. 11D shows the position from the enhanced interim forward navigation solution as trace 1116, from the enhanced interim backward navigation solution as trace 1118, and the smoothed position resulting from combining the enhanced interim forward and backward navigation solutions as trace 1120.

Figure 12A:
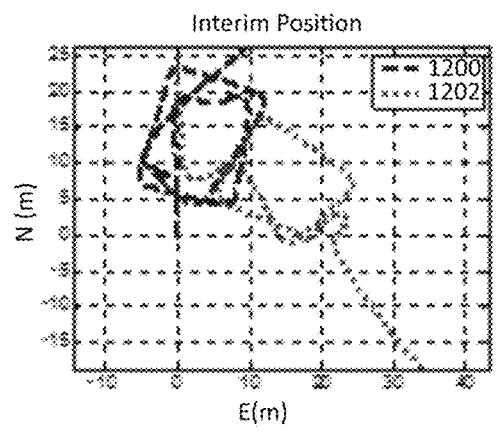
FIGS. 12A-D depict results for multiple pass smoothing of a navigation solution for a portable device m a dangling use case including a third orientation according to an embodiment.
Figure 12B:
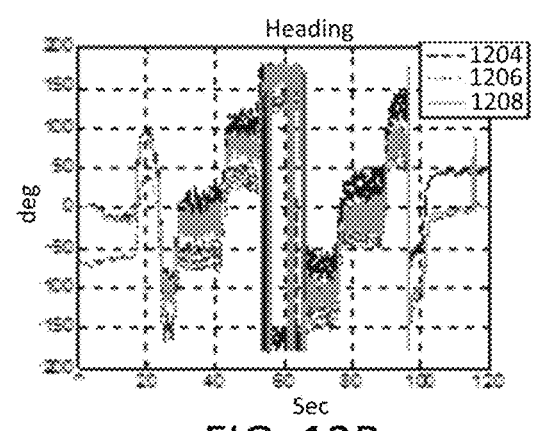
Figure 12C:
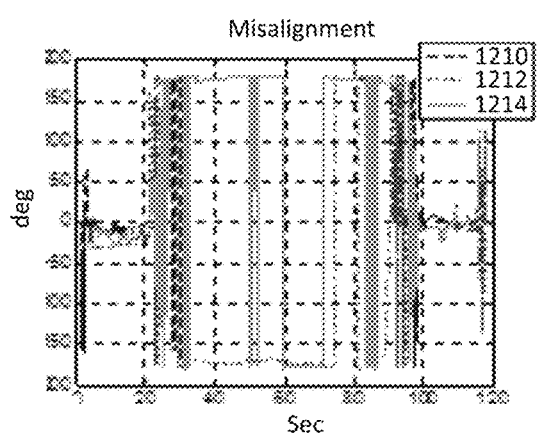
Figure 12D:
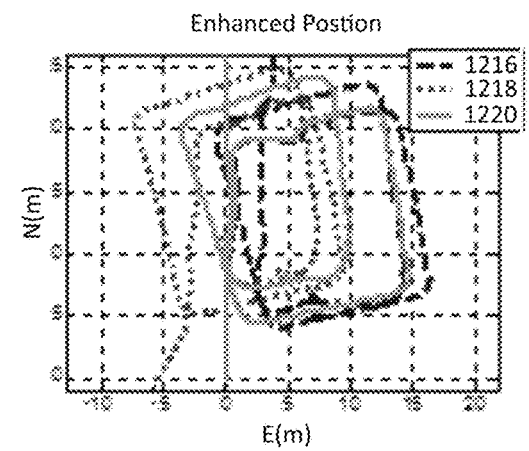

Further, FIG. 12A shows the position from the interim forward navigation solution as trace 1200 and from the interim, backward navigation solution as trace 1202; FIG. 12B shows the heading from the interim forward navigation solution as trace 1204, from the interim backward navigation solution as trace 1206, and the smoothed heading resulting from combining the interim forward and backward navigation solutions as trace 1208; FIG. 12C shows the misalignment angle from the interim forward navigation solution as trace 1210, from the interim backward navigation solution as trace 1212, and the smoothed misalignment angle resulting from combining the interim forward and backward navigation solutions as trace 1214; and FIG. 12D shows the position from the enhanced interim forward navigation solution as trace 1216, from the enhanced interim backward navigation solution as trace 1218, and the smoothed position resulting from combining the enhanced interim forward and backward navigation solutions as trace 1220.

The results for the pocket tests are depicted in FIGS. 13-15. During the intervening second time periods, the phone was placed with the speaker forward and the screen outside in the right pocket to provide the results shown in FIG. 13, the phone was placed with the speaker up and the screen inside in the right pocket to provide the results shown in FIG. 14 and the phone was placed with the speaker backward and the screen inside by the left pocket to provide the results shown in FIG. 15.

Figure 13A:
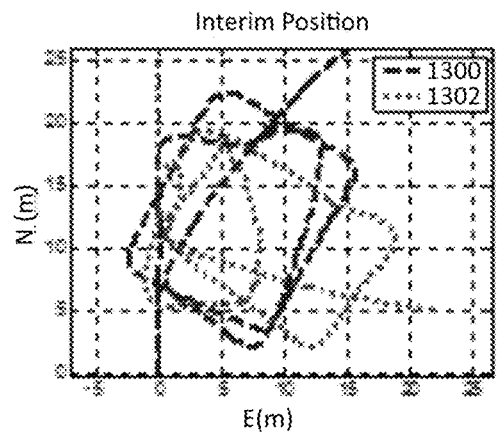
FIGS. 13A-D depict results for multiple pass smoothing of a navigation solution for a portable device in a pocket use case including a first orientation according to an embodiment.
Figure 13B:
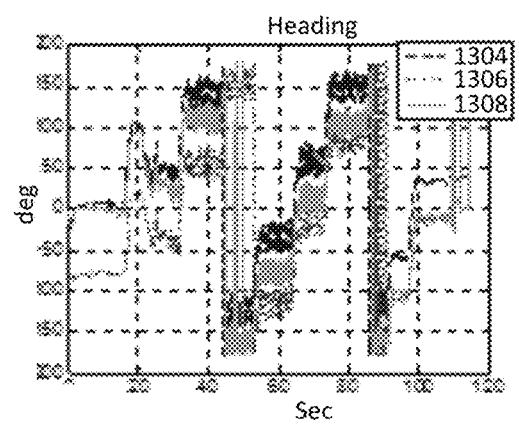
Figure 13C:
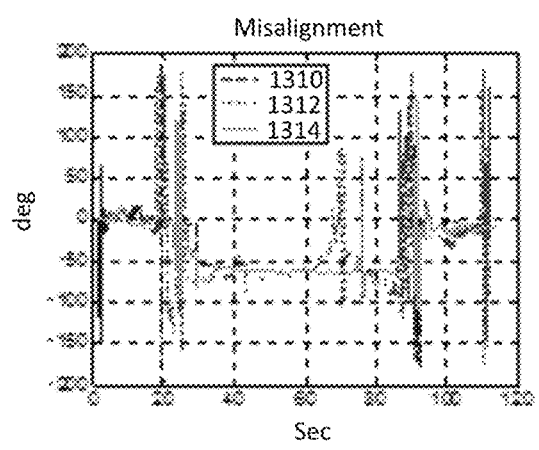
Figure 13D:
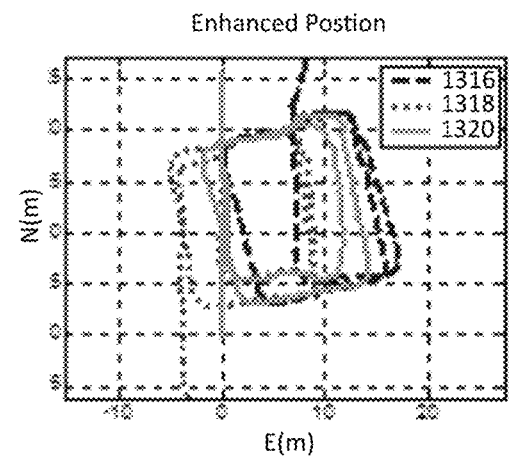

Specifically, FIG. 13A shows the position from the interim forward navigation solution as trace 1300 and from the interim backward navigation solution as trace 1302; FIG. 13B shows the heading from the interim forward navigation solution as trace 1304, from the interim backward navigation solution as trace 1306, and the smoothed heading resulting from combining the interim forward and backward navigation solutions as trace 1308; FIG. 13C shows the misalignment angle from the interim forward navigation solution as trace 1310, from the interim backward navigation solution as trace 1312, and the smoothed misalignment angle resulting from combining the interim forward and backward navigation solutions as trace 1314; and FIG. 13D shows the position from the enhanced interim forward navigation solution as trace 1314 from the enhanced interim backward navigation solution as trace 1318, and the smoothed position resulting from combining the enhanced interim forward and backward navigation solutions as trace 1320.

Figure 14A:
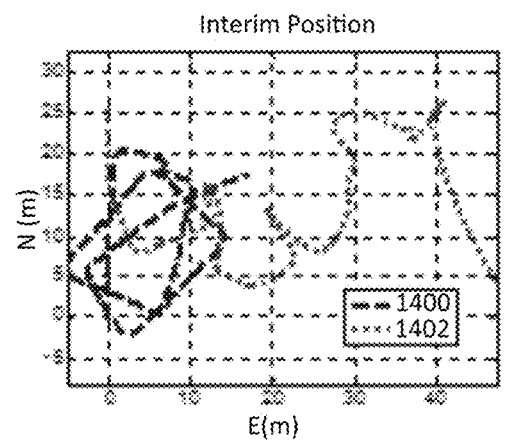
FIGS. 14A-D depict results for multiple pass smoothing of a navigation solution for a portable device in a pocket use case including a second orientation according to an embodiment.
Figure 14B:
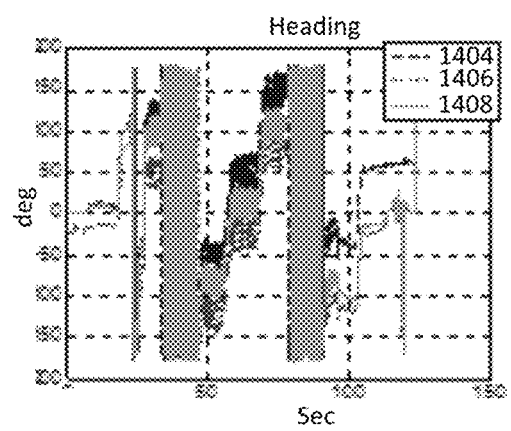
Figure 14C:
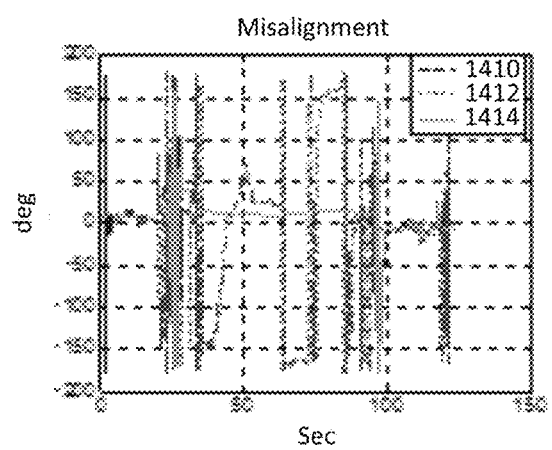
Figure 14D:
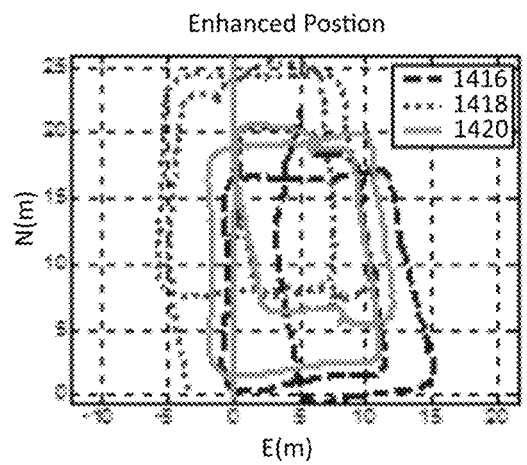

Similarly, FIG. 14A shows the position from the interim forward navigation solution as trace 1400 and from the interim backward navigation solution as trace 1402; FIG. 14B shows the beading from the interim forward navigation solution as trace 1404, from the interim backward navigation solution as trace 1406, and the smoothed heading resulting from combining the interim forward and backward navigation solutions as trace 1408; FIG. 14C shows the misalignment angle from the interim forward navigation solution as trace 1410, from the interim backward navigation solution as trace 1412, and the smoothed misalignment angle resulting from combining the interim forward and backward navigation solutions as trace 1414; and FIG. 14D shows the position from the enhanced interim forward navigation solution as trace 1416, from the enhanced interim backward navigation solution as trace 1418, and the smoothed position resulting from combining the enhanced interim forward and backward navigation solutions as trace 1420.

Figure 15A:
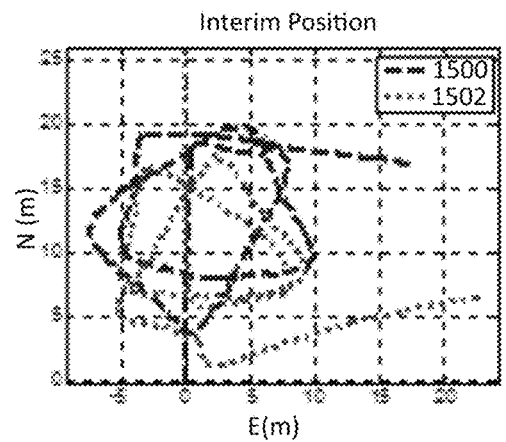
FIGS. 15A-D depict results for multiple pass smoothing of a navigation solution for a portable device in a pocket use case including a third orientation according to an embodiment.
Figure 15B:
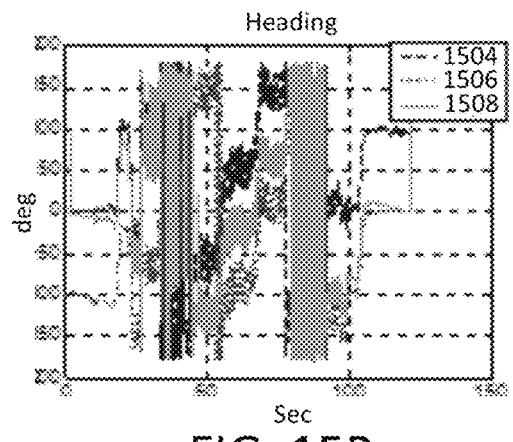
Figure 15C:
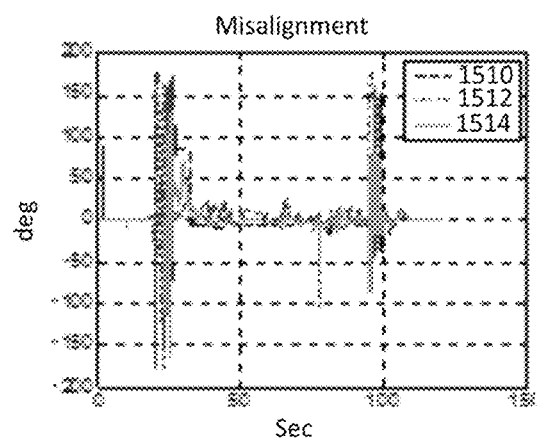
Figure 15D:
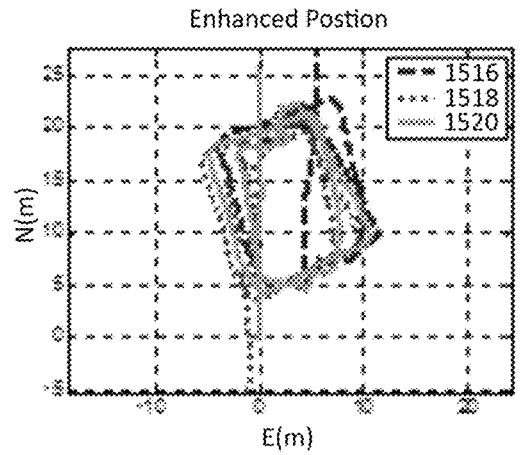

Further, FIG. 15A shows the position from the interim forward navigation solution as trace 1500 and front the interim backward navigation solution as trace 1502; FIG. 15B shows the heading from the interim forward navigation solution is trace 1504, from the interim backward navigation solution as trace 1506, and the smoothed heading resulting from combining the interim forward and backward navigation solutions as trace 1508; FIG. 15C shows the misalignment angle from the interim forward navigation solution as trace 1510, from the interim backward navigation solution as trace 1512, and the smoothed misalignment angle resulting from combining the interim forward and backward navigation solutions as trace 1514; and FIG. 15D shows the position from the enhanced interim forward navigation solution as trace 1516, from the enhanced interim backward navigation solution as trace 1518, and the smoothed position resulting from combining the enhanced interim forward and backward navigation solutions as trace 1520.

As will be appreciated, the "B" figures show that the heading was accurate at the beginning but kept diverging in both forward and backward interim solutions. However, the smoothed heading took advantage of both solutions and was closer to the true values over the whole navigation process. Further, the "D" figures illustrate that the enhanced interim solutions were more accurate than the interim solutions due to the use of the smoothed heading and misalignment and that the positions from the enhanced smoothed navigation solution were significantly better than the interim solutions. Since these tests represent different use cases, they illustrate that the enhanced smoothed navigation solutions are significantly more accurate than the forward navigation solutions. Therefore, the MPS process may be used to significantly improve pedestrian navigation performance without the need for any external hardware, and may promote popularization and application of sensors in consumer portable devices.

To further illustrate applications of this disclosure's techniques, additional tests were conducted to utilize the MPS process to provide bridging solutions in conjunction with absolute navigation information. In particular, the GNSS receiver of the test device was duty cycled, with an initial active period of 15 seconds followed by 45 seconds inactive and concluded with another 15 second active period. First and second instants were selected during each 15 second active period (the first instant was selected at the beginning of the first 1.5 seconds in this section, and the second instant was selected at the end of the last 15 seconds in this section) and the section from the first to second instant was subjected to multiple pass smoothing. The results are depicted in FIGS. 16-19. It has to be noted that this stagey with duty cycled GNSS data will provide an overlap between the different sections representing the parts where GNSS existed. A final smoothing can be applied between the different sections after processing all sections.

Figure 16A:
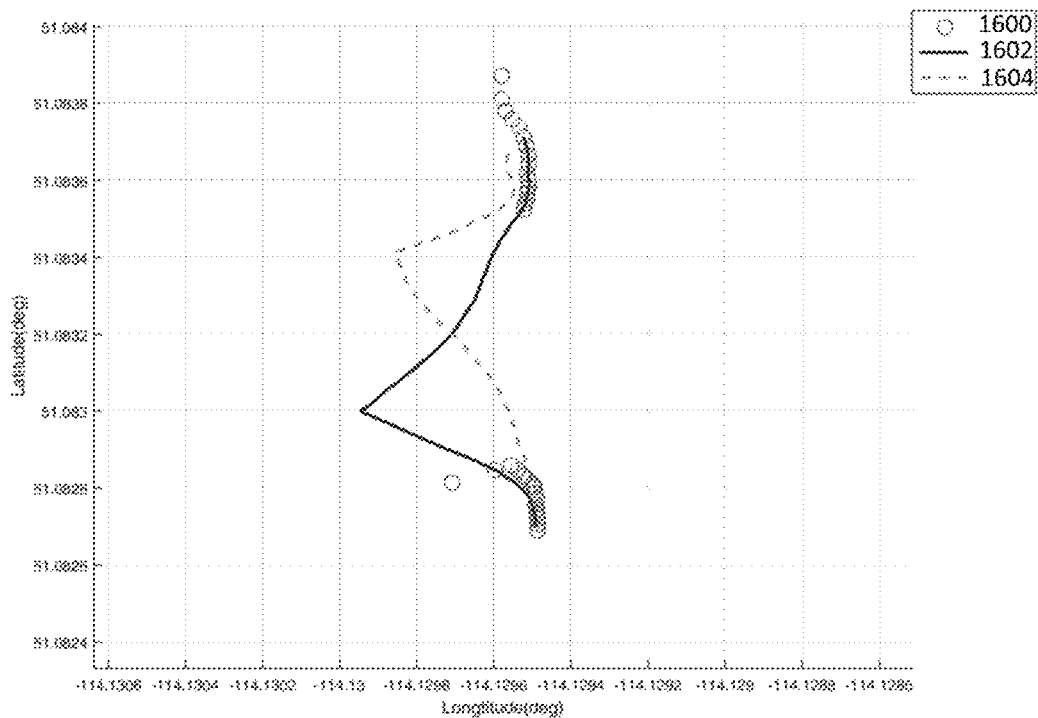
FIGS. 16A and B depict results for multiple pass smoothing of a navigation solution for a portable device in a first straight trajectory according to an embodiment.
Figure 16B:
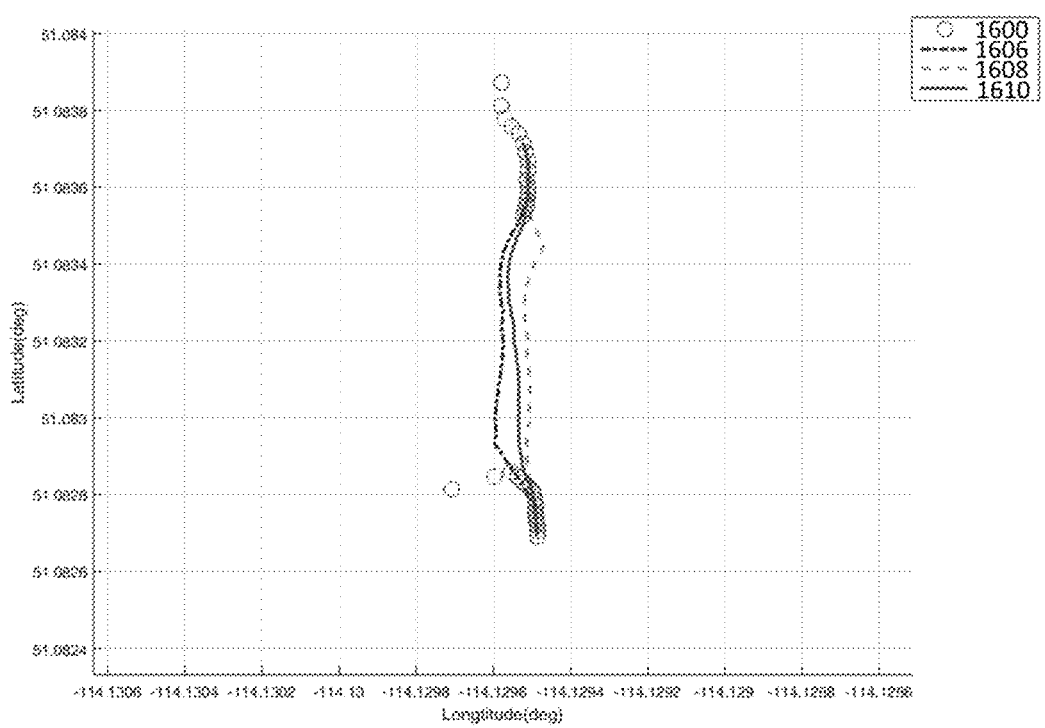

In a first test, a straight section was followed from top to bottom as indicated in FIGS. 16A and B. The absolute navigation information from the GNSS system is represented by the open circles 1600 in both FIGS. 16A and B, while FIG. 16A shows the interim forward navigation solution as trace 1602 and the interim backward navigation solution shown as trace 1604. Correspondingly, FIG. 16B shows the enhanced interim forward navigation solution as trace 1606 and the enhanced interim backward navigation solution as trace 1608. The enhanced interim navigation solutions were determined following smoothing of misalignment angle and heading from the interim navigation solutions and used to provide the enhanced navigation solution represented by trace 1610.

Figure 17A:
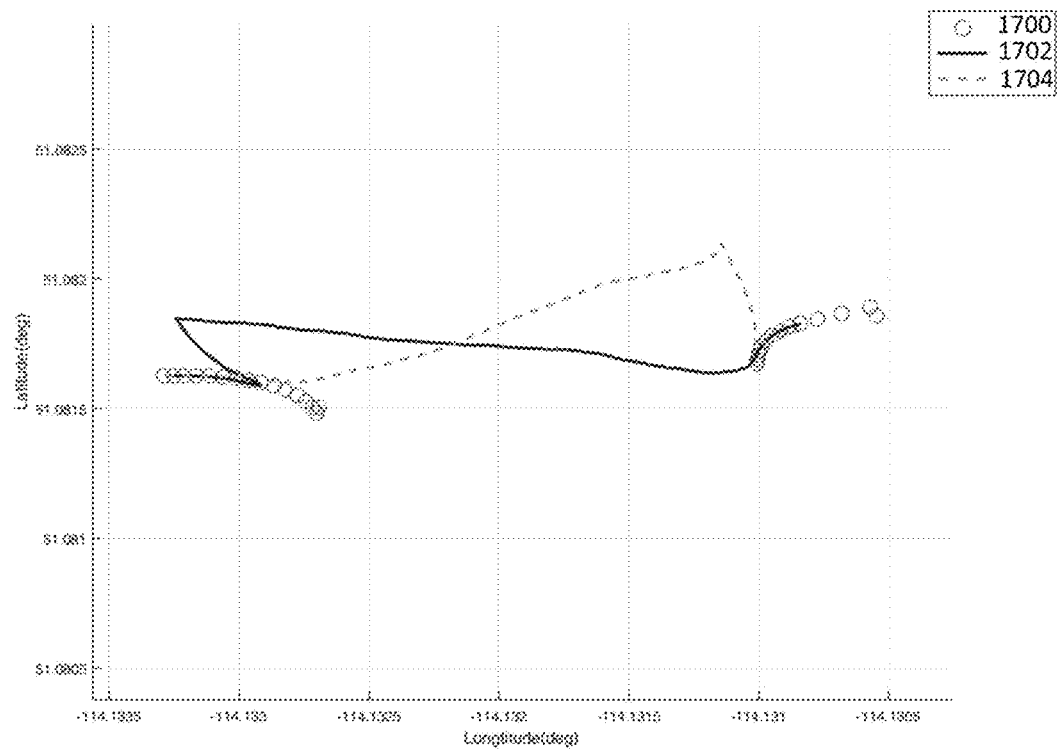
FIGS. 17A and B depict results for multiple pass smoothing of a navigation solution for a portable device in a second straight trajectory according to an embodiment.
Figure 17B:
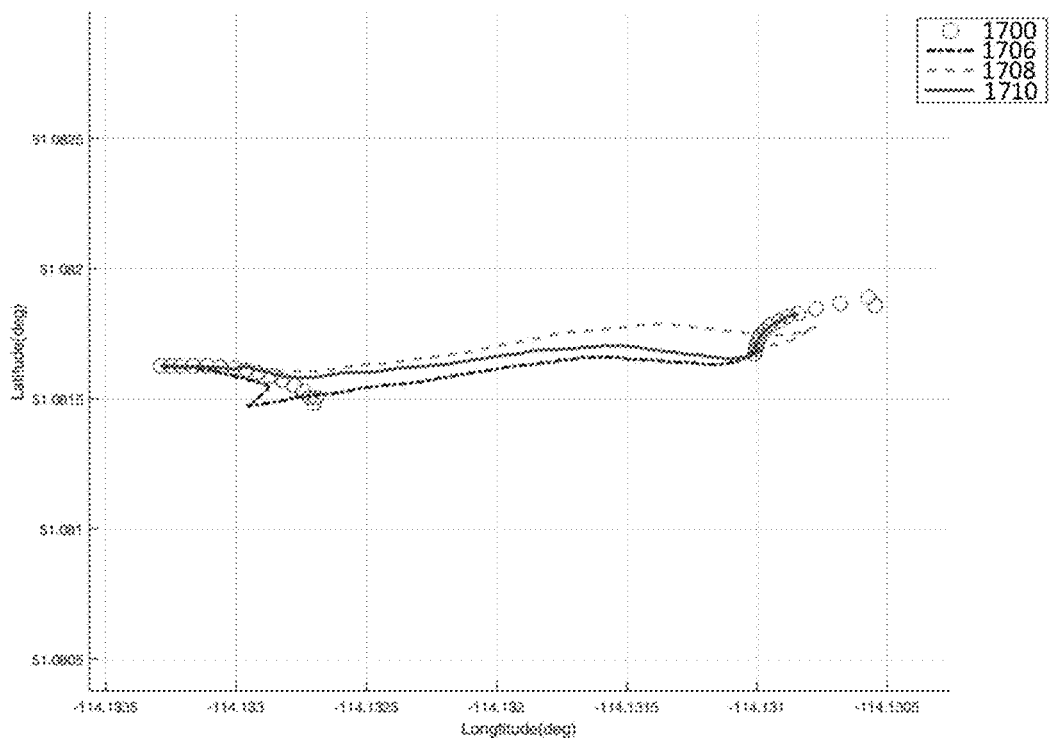

In a second test, a straight section was followed from right to left as indicated in FIGS. 17A and B. The absolute navigation information from the GNSS system is represented by the open circles 1700 in both FIGS. 17A and B, while FIG. 17A shows the interim forward navigation solution as trace 1702 and the interim backward navigation solution shown as trace 1704. Likewise, FIG. 17B shows the enhanced interim forward navigation solution as trace 1706 and the enhanced interim backward navigation solution as trace 1708. Again, the enhanced interim navigation solutions were determined following smoothing of misalignment angle and heading from the interim navigation solutions and used to provide the enhanced navigation solution represented by trace 1710.

Figure 18A:
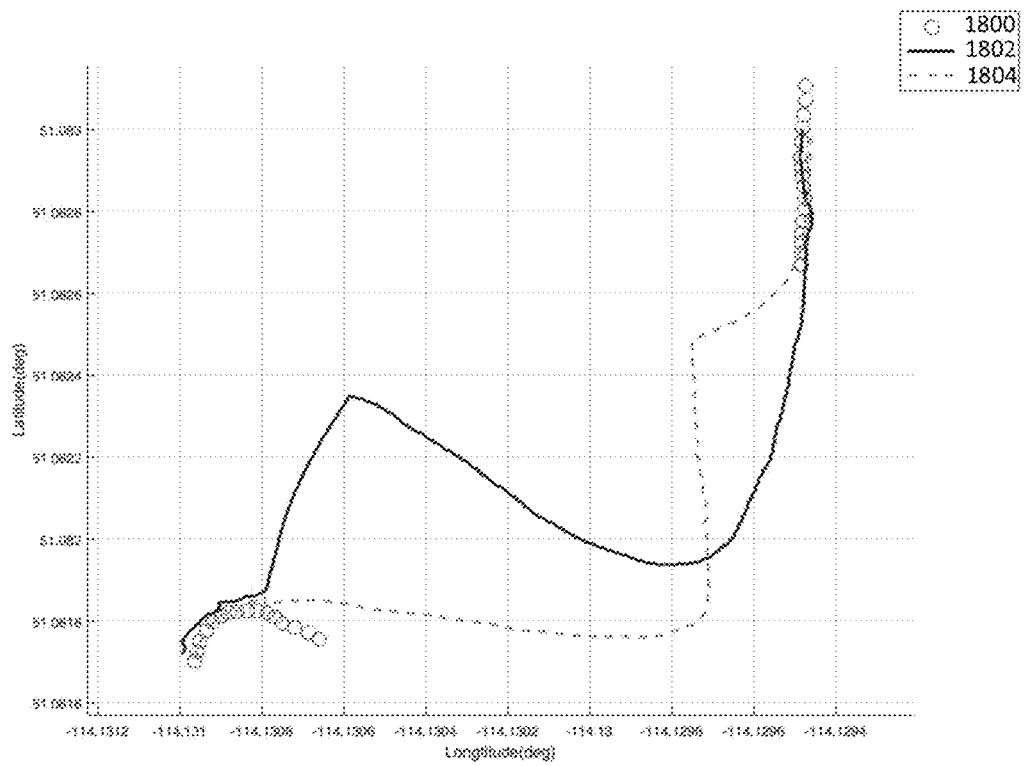
FIGS. 18A and B depict results for multiple pass-smoothing of a navigation solution for a portable device in trajectory having a single turn according to an embodiment.
Figure 18B:
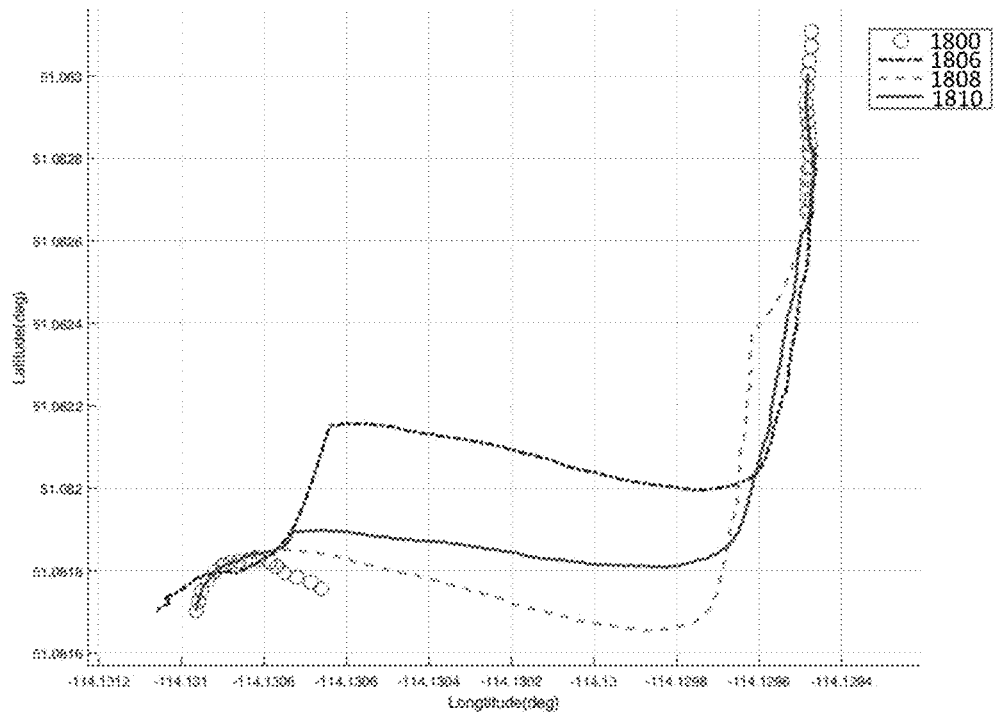

Another test was conducted with a section having a single right hand turn, beginning at the upper right and ending at the lower left as shown in FIGS. 18A and B. The absolute navigation information from the GNSS system is represented by the open circles 1800 in both FIGS. 18A and B, while FIG. 18A shows the interim forward navigation solution as trace 1802 and the interim backward navigation solution shown as trace 1804. Again, FIG. 18B shows the enhanced interim forward navigation solution as trace 1806 and the enhanced interim backward navigation solution as trace 1808. The enhanced interim navigation solutions were determined following smoothing of misalignment angle and heading from the interim navigation solutions and used to provide the enhanced navigation solution represented by trace 1810.

Figure 19A:
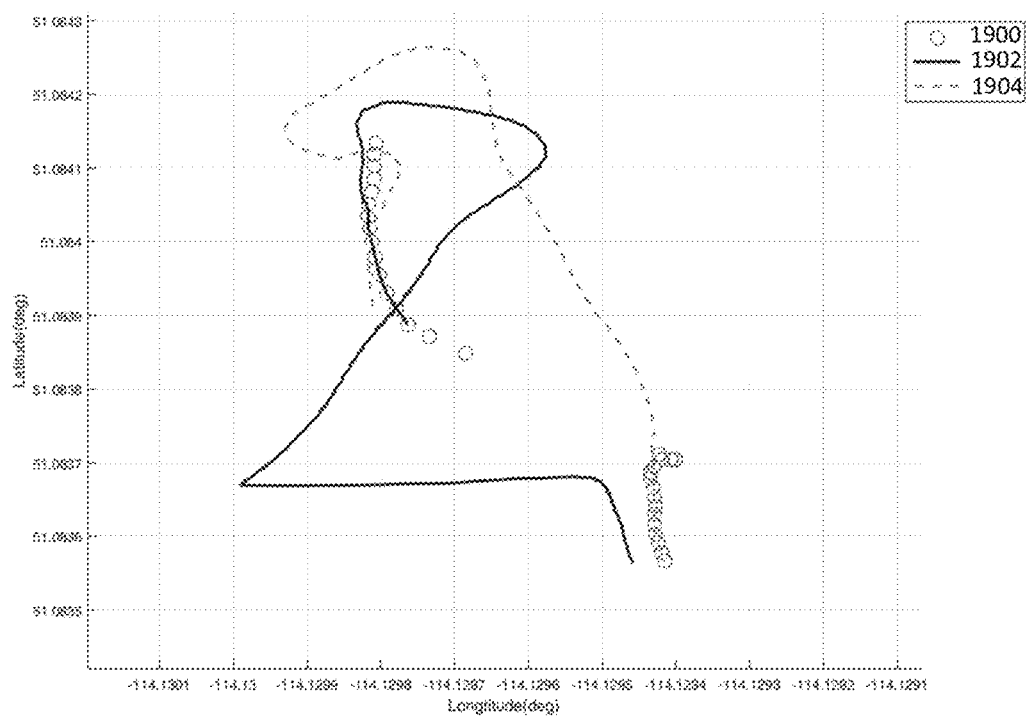
FIGS. 19A and B depict results for multiple pass smoothing of a navigation solution for a portable device in trajectory having two turns according to an embodiment.
Figure 19B:
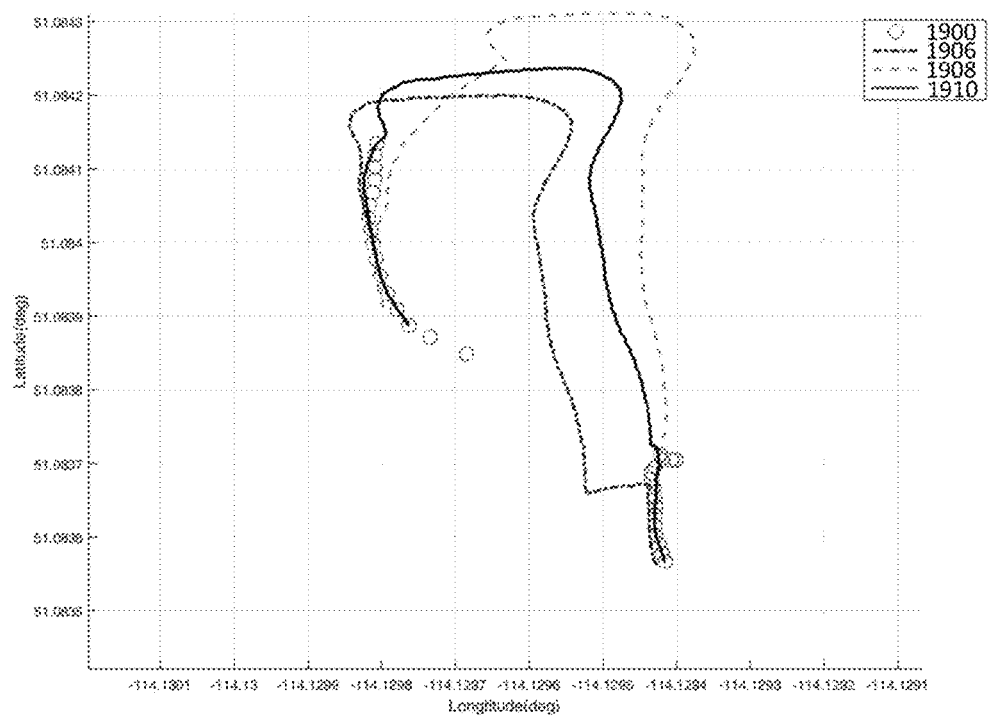

Yet another test was conducted with a section having a two consecutive right hand turns, beginning at the middle left and ending at the right as shown in FIGS. 10A and B. The absolute navigation information from the GNSS system is represented by the open circles 1900 in both FIGS. 19A and B, while FIG. 19A shows the interim forward navigation solution as trace 1902 and the interim backward navigation solution shown as trace 1004. FIG. 19B shows the enhanced interim forward navigation solution as trace 1900 and the enhanced interim backward navigation solution as trace 1908. The enhanced interim navigation solutions were determined following smoothing of misalignment angle and heading from the interim navigation solutions and used to provide the enhanced navigation solution represented by trace 1910.

In all of the tests corresponding to FIGS. 16-19, it may be seen that the interior forward and backward navigation solutions provide trajectories that are initially accurate and in agreement with the GNSS information but drift over time once the GNSS information is no longer available. These interim solutions are significantly improved by the enhanced interim forward and backward navigation solutions that exploit the smoothed misalignment and heading quantities. By smoothing quantities such as misalignment angle and/or heading from the interim forward and backward navigation solutions, cross track errors may be reduced. Further, employing the smoothed quantities in forward and backward processing to derive the enhanced interim navigation solutions may reduce along track errors. The final enhanced navigation solution represents the most accurate trajectory and successfully bridges the periods when the GNSS system was inactive. Further, it may be seen that the initial GNSS information following reactivation may be subject to error, such that the first several readings may be discarded as described above.

Figure 20A:
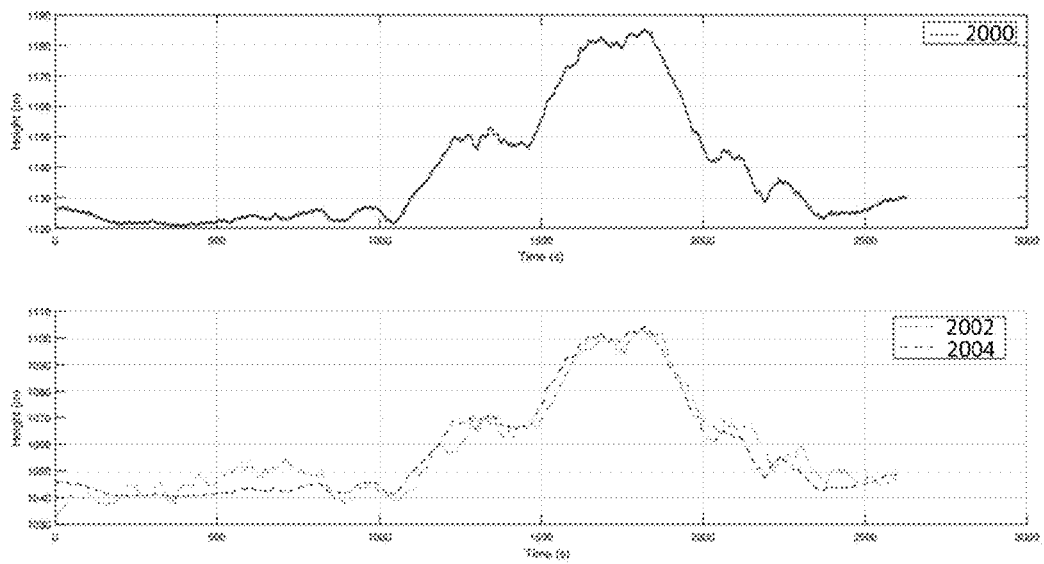
FIGS. 20A and B depict results for height smoothing of a navigation solution in a first test according to an embodiment.
Figure 20B:
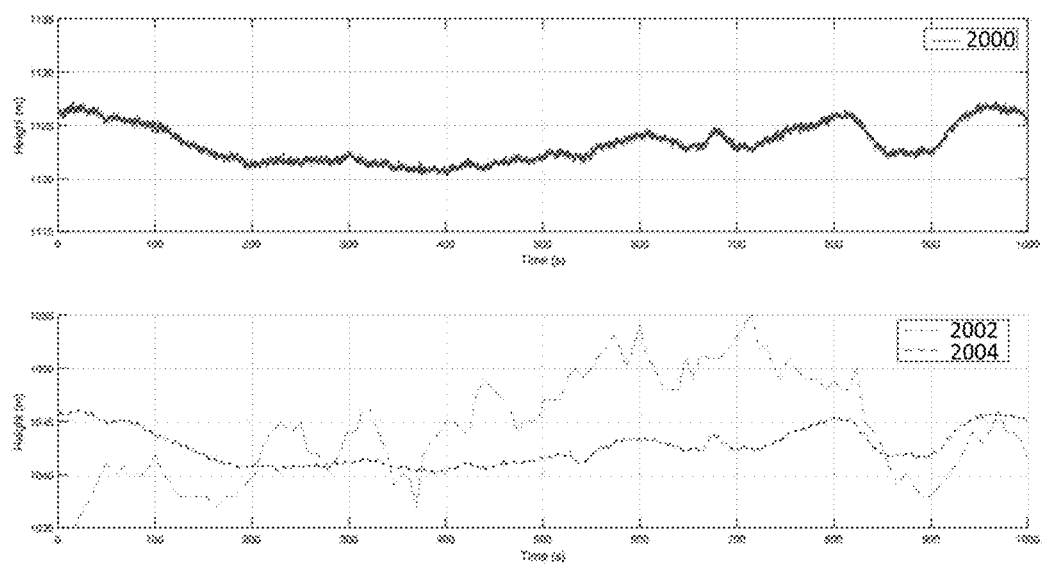
Figure 21:
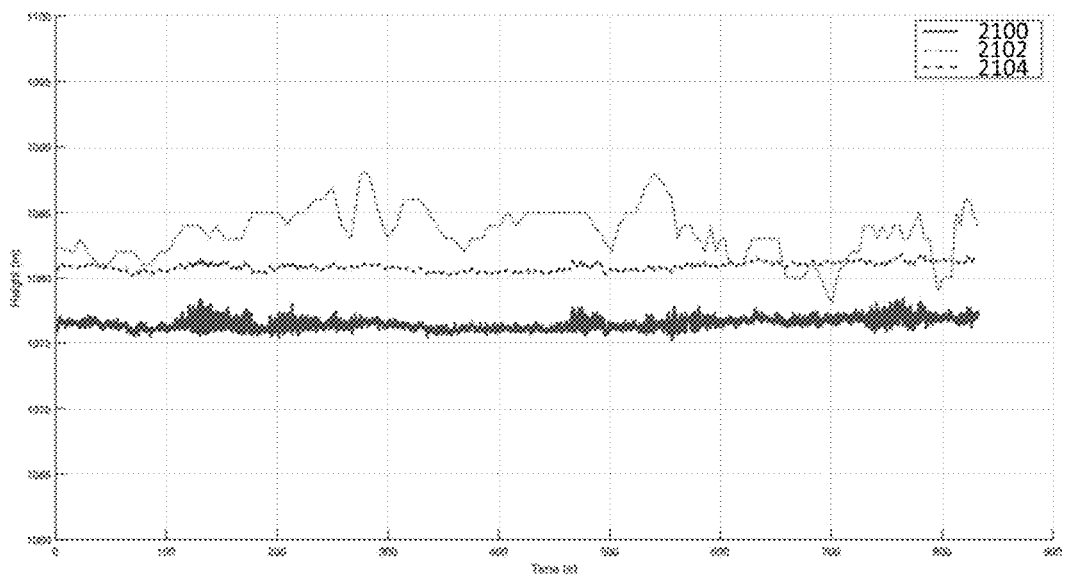
FIG. 21 depict results for height smoothing of a navigation solution in a second test according to an embodiment.

Another set of tests were conducted to demonstrate height smoothing that may be applied to the enhanced navigation solutions derived from the MPS techniques of this disclosure. The results of these tests are shown in FIGS. 20 and 21. In the first test, FIG. 20A shows the overall results and FIG. 20B provides a more detailed view of a portion of the results. In both FIGS. 20A and B, the barometer data is shown as trace 2000, the height as derived from the GNSS system is shown as trace 2002 and the smoothed height is shown as trace 2004. In the second test shown in FIG. 21, the barometer data is shown as trace 2100, the height as derived from the GNSS system is shown as trace 2102 and the smoothed height is shown as trace 2104. For both tests, it may be appreciated that the barometer data is degraded by noise and by bias. The GNSS information may be used to estimate the offset, while the noise may be reduced by smoothing the barometer data or by filtering the barometer data using motion sensor data, such as accelerometer and/or gyroscope information, to smooth the output. As indicated by the smoothed height shown by traces 2004 and 2104, noise is reduced and the offset has been compensated.

Figure 22:
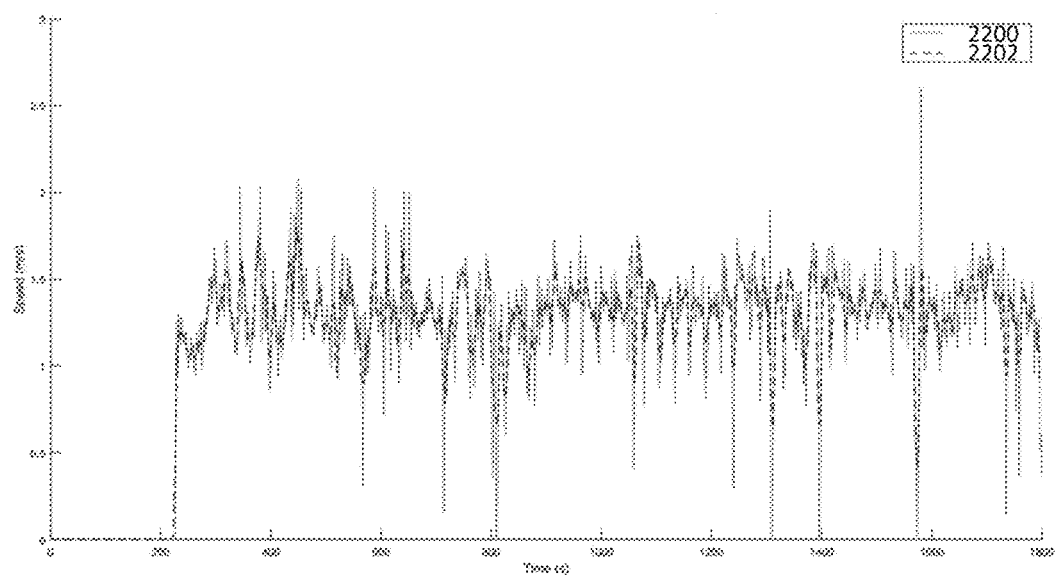
FIG. 22 depicts results for speed smoothing of a navigation solution in a first test according to an embodiment.
Figure 23:
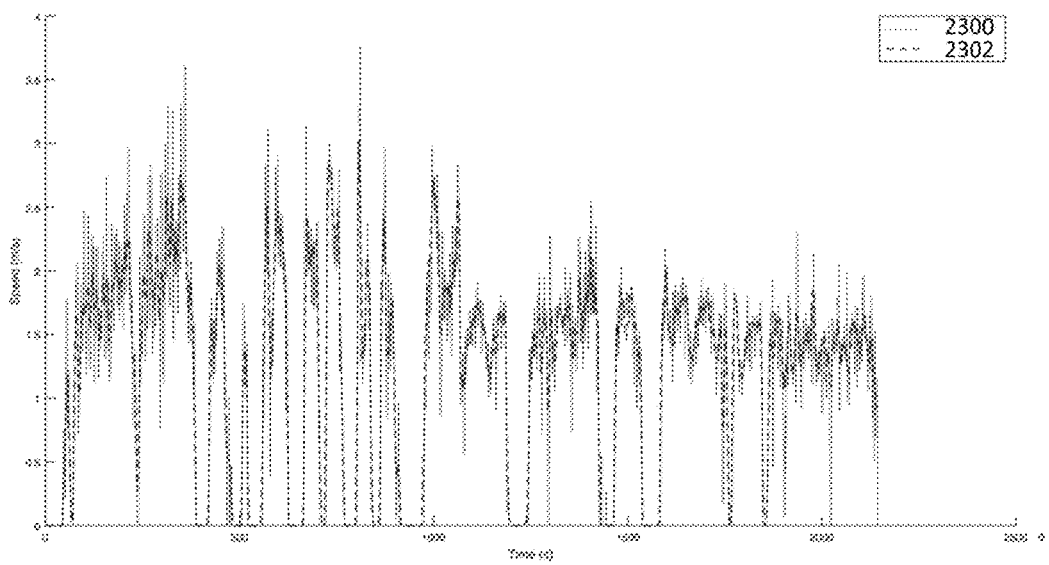
FIG. 23 depicts results for speed smoothing of a navigation solution in a second test according to an embodiment.
Figure 24:
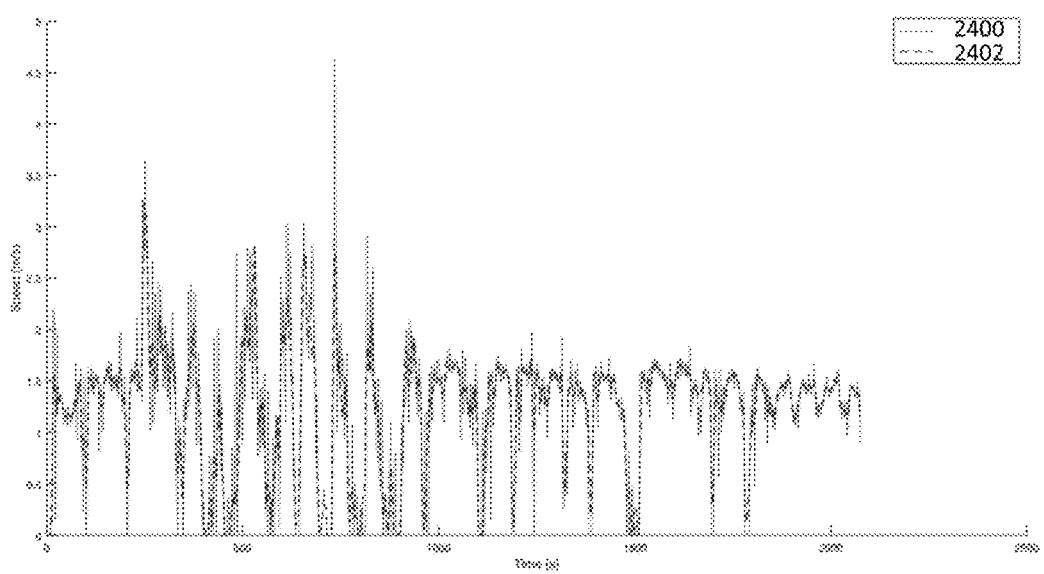
FIG. 24 depicts results for speed smoothing of a navigation solution in a third test according to an embodiment.

Yet another set of tests were conducted to demonstrate time-based smoothing of the speed quantity from the enhanced navigation solutions. With the results shown in FIGS. 22-24, in a first test represented by the results depicted in FIG. 22, the speed as output by the enhanced navigation solution following the MPS process is indicated by trace 2200 and the speed quantity following time-based smoothing is indicated by trace 2202. Likewise, in a second test represented by the results depicted in FIG. 23, the speed as output by the enhanced navigation solution following the MPS process is indicated by trace 2300 and the speed quantity following time-based smoothing is indicated by trace 2302. Finally, in a third test represented by the results depleted in FIG. 24, the speed as output by the enhanced navigation solution following the MPS process is indicated by trace 2400 and the speed quantity following time-based smoothing is indicated by trace 2402. In each of these exemplary tests, it may be seen that time-based smoothing reduces noise in the quantity output by the enhanced navigation solutions. Similar techniques may be used to perform time-based smoothing of other suitable quantities of the enhanced navigation solution, including without limitation, velocity, position (e.g., latitude and/or longitude), height, and others.

CONTEMPLATED EMBODIMENTS

The present disclosure describes the body frame to be x forward, y positive towards right side of the body and z axis positive downwards, it is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and file pedestrian.

It is further contemplated that techniques of this disclosure can also be used with a navigation solution that is further programmed to run, in the background, a routine to simulate artificial outages in the absolute navigation information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigation information (e.g. GNSS); the forward integrated navigation solution in the device integrating the available sensors with the absolute navigation information (e.g. GNSS) and possibly with the optional speed or velocity readings; or a backward smoothed integrated navigation solution integrating the available sensors with the absolute navigation information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map aided or model aided routine. Map aided or model aided can further enhance the navigation solution during the absolute navigation information (such as GNSS) degradation or interruption. In the case of model aided, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-bused pseudoranges) and the Doppler measurements (used to gel the pseudorange rates). The carrier phase measurement of the GNSS receiver can be used as well, for example: (i) an alternate way to calculate ranges instead of the code-based pseudoranges, or (ii) to enhance the range calculation by incorporating information from both code-based pseudorange and carrier-phase measurements such enhancement is the carrier-smoothed pseudorange.

It is further contemplated that the techniques of this disclosure can also be used with a navigation solution that relies on an ultra-light integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but it not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information front other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is also contemplated that the techniques of this disclosure may involve use of a sensor processor and one or more sensors formed on different chips or on the same chip. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the water-level minimizes parasitic capacitances, allowing for improved signal-to-noise relative to a discrete solution. Such integration at the wafer-level also enables the incorporation of a rich feature set which minimizes the need for external amplification.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method configured to enhance a navigation solution for a device and a platform through multiple pass smoothing, wherein the mobility of the device is constrained or unconstrained within the platform and wherein the device may be tilted to any orientation, the method comprising:
   a) obtaining input data comprising sensor data acquired from a sensor assembly integrated with the device and representing motion of the device at a plurality of epochs from a first instant to a subsequent second instant;
   b) performing forward processing of the input data to derive interim forward navigation solutions for the epochs;
   c) performing backward processing of the input data to derive interim backward navigation solutions for the epochs;
   d) combining at least one quantity of the navigation solution from the interim forward and backward navigation solutions to obtain a smoothed version of the at least one combined quantity;
   e) performing forward processing of the input data and the at least one combined quantity to derive enhanced interim forward navigation solutions for the epochs;
   f) performing backward processing of the input data and the at least one combined quantity to derive enhanced interim backward navigation solutions for the epochs;
   g) combining at least one uncombined quantity of the navigation solution from the enhanced interim forward and backward navigation solutions to obtain an enhanced smoothed navigation solution; and
   h) providing the enhanced smoothed navigation solution.

2. The method of claim 1, further comprising performing at least one additional smoothing pass by performing d), e) and f) with respect to at least one additional quantity of the navigation solution before performing g), wherein the interim forward and backward in step d) of the additional pass are replaced by the enhanced interim forward and backward from previous pass step e) and f).

3. The method of claim 1, wherein performing forward processing of the input data to derive interim forward navigation solutions for the epochs comprises applying a forward processing algorithm and wherein performing backward processing of the input data to derive interim backward navigation solutions for the epochs comprises transforming the input data and applying the forward processing algorithm to the transformed sensor data from the second instant to the first instant.

4. The method of claim 3, wherein transforming the input data comprises transforming sensor data.

5. The method of claim 4, wherein transforming the sensor data comprises transforming accelerometer and gyroscope data.

6. The method of claim 4, wherein transforming the sensor data comprises transforming available sensor data selected from the group consisting of accelerometer, gyroscope, magnetometer, barometer and odometer data.

7. The method of claim 1, wherein the input data comprises absolute navigational information.

8. The method of claim 7, wherein the absolute navigation information is at least one of the group consisting of: (i) a global navigation satellite system (GNSS) information; (ii) cell-based navigational information; (iii) WiFi-based navigational information; and (iv) other wireless-based navigational information.

9. The method of claim 3, wherein the input data comprises absolute navigational information and transforming the input data comprises transforming absolute navigational information.

10. The method of claim 9, wherein transforming the absolute navigational information comprises transforming any available quantity selected from the group consisting of: (i) absolute position; (ii) absolute velocity; (iii) absolute attitude angles; and (iv) absolute heading angle.

11. The method of claim 9, wherein transforming the absolute navigational information comprises transforming any available information selected from the group consisting of: (i) a global navigation satellite system (GNSS); (ii) cell-based navigational information; (iii) WiFi-based navigational information; and (iv) other wireless-based navigational information.

12. The method of claim 1, wherein performing backward processing of the input data to derive interim backward navigation solutions for the epochs comprises applying a backward processing algorithm without transforming the input data.

13. The method of claim 1, further comprising combining multiple quantities of the navigation solution that do not depend on each other from the interim forward and backward navigation solutions.

14. The method of claim 13, wherein the multiple quantities comprise heading and misalignment angle.

15. The method of claim 1, wherein combining a quantity of the navigation solution comprises weighting quantities derived from forward and backward processing.

16. The method of claim 15, wherein weighting quantities derived from forward and backward processing comprises assessing forward and backward accuracy.

17. The method of claim 16, wherein assessing forward and backward accuracy is based at least in part on a standard deviation of solution errors.

18. The method of claim 15, wherein weighting quantities derived from forward and backward processing comprises a linear combination.

19. The method of claim 1, further comprising characterizing an error in the input data and compensating for the error before performing at least one of the forward and backward processing.

20. The method of claim 19, further comprising detecting a predefined motion pattern of the device and characterizing the error in the input data based at least in part on the detected predefined motion period.

21. The method of claim 20, wherein the predefined motion pattern comprises a static period and wherein the error comprises a gyroscope bias.

22. The method of claim 21, further comprising transforming the gyroscope bias and performing backward processing using the transformed gyroscope bias.

23. The method of claim 1, further comprising identifying an anchor point, wherein at least one of the first instant and the second instant corresponds to when the device is at the identified anchor point.

24. The method of claim 23, further comprising identifying a plurality of anchor points, wherein both the first instant and the second instant correspond to when the device is at identified anchor points.

25. The method of claim 1, wherein the input data further comprises supplemental navigation information for the device obtained from at least one of a barometer, a magnetometer, an odometer, a speedometer and a pedestrian motion model.

26. The method of claim 1, further comprising performing at least one time-based smoothing process for at least one quantity of the navigation solution.

27. The method of claim 26, wherein the time-based smoothing process smoothing is a non-causal process.

28. The method of claim 26, wherein the time-based smoothing process is performed for height.

29. The method of claim 26, wherein the time-based smoothing process is performed for latitude.

30. The method of claim 26, wherein the time-based smoothing process is performed for longitude.

31. The method of claim 26, wherein the time-based smoothing process is performed for velocity.

32. The method of claim 26, wherein the time-based smoothing process is performed for speed.

33. The method of claim 1, further comprising smoothing a height quantity of the navigation solution by obtaining barometer data, obtaining absolute navigation information, determining a bias of the barometer data based at least in part on the absolute navigation information, correcting the barometer data based at least in part on the determined bias, and smoothing the barometer data.

34. The method of claim 1, wherein a) is performed locally with respect to the device and b)-h) are performed remotely.

35. The method of claim 1, wherein a) and b) are performed locally with respect to the device and c)-h) are performed remotely.

36. The method of claim 1, wherein a)-h) are performed locally with respect to the device.

37. A device configured to provide an enhanced navigation solution through multiple pass smoothing, wherein the mobility of the device is constrained or unconstrained within the platform and wherein the device may be tilted to any orientation, the device comprising an integrated sensor assembly, configured to output sensor data representing motion of the device at a plurality of epochs from a first instant to a subsequent second instant, and a processor configured to implement an MPS navigation module to derive an enhanced smoothed navigation solutions by:
  a) obtaining input data comprising the sensor data acquired from the device;
  b) performing forward processing of the input data to derive interim forward navigation solutions for the epochs;
  c) performing backward processing of the input data to derive interim backward navigation solutions for the epochs;
  d) combining at least one quantity of the navigation solution from the interim forward and backward navigation solutions to obtain a smoothed version of the at least one combined quantity;
  e) performing forward processing of the input data and the at least one combined quantity to derive enhanced interim forward navigation solutions for the epochs;
  f) performing backward processing of the input data and the at least one combined quantity to derive enhanced interim backward navigation solutions for the epochs;
  g) combining at least one uncombined quantity of the navigation solution from the enhanced interim forward and backward navigation solutions to obtain an enhanced smoothed navigation solution; and
  h) providing the enhanced smoothed navigation solution.

38. The device of claim 37, further comprising a source of absolute navigation information for the device, wherein the input data further comprises the absolute navigation information.

39. The device of claim 38, wherein the absolute navigation information is obtained from at least one of the group consisting of: (i) a global navigation satellite system (GNSS); (ii) cell-based positioning; (iii) WiFi-based positioning; or (iv) other wireless-based positioning.

40. The device of claim 37, wherein the sensor assembly comprises an accelerometer and a gyroscope.

41. The device of claim 37, wherein the sensor assembly comprises an accelerometer, a gyroscope, a magnetometer, and a barometer.

42. The device of claim 37, wherein the sensor assembly comprises an inertial sensor implemented as a Micro Electro Mechanical System (MEMS).

43. The device of claim 37, further comprising at least one source of supplemental navigation information obtained from the group consisting of a barometer, a magnetometer, an odometer, a speedometer and a pedestrian motion mode and wherein the input data further comprises the supplemental navigation information.

44. A server configured to enhance a navigation solution of a device and a platform through multiple pass smoothing, wherein the mobility of the device is constrained or unconstrained within the platform and wherein the device may be tilted to any orientation, the server comprising a communications module for receiving input data provided by the device, wherein the input data comprises sensor data acquired from a sensor assembly integrated with the device and representing motion of the device at a plurality of epochs from a first instant to a subsequent second instant, and a processor configured to implement an MPS navigation module to derive an enhanced smoothed navigation solution for the device by:
  a) obtaining interim forward navigation solutions for the epochs;
  b) performing backward processing of the input data to derive interim backward navigation solutions for the epochs;
  c) combining at least one quantity of the navigation solution from the interim backward navigation solutions and an interim forward navigation solution to obtain a smoothed version of the at least one combined quantity;
  d) performing forward processing of the input data and the at least one combined quantity to derive enhanced interim forward navigation solutions for the epochs;
  e) performing backward processing of the input data and the at least one combined quantity to derive enhanced interim backward navigation solutions for the epochs;
  f) combining at least one uncombined quantity of the navigation solution from the enhanced interim forward and backward navigation solutions to obtain an enhanced smoothed navigation solution; and
  g) providing the enhanced smoothed navigation solution.

45. The server of claim 44, wherein the input data received from the device further comprises the interim forward navigation solution.

46. The server of claim 44, wherein the MPS navigation module on the server is configured to derive the interim forward navigation solution by performing forward processing of the input data.

47. A system configured to provide an enhanced smoothed navigation solution through multiple pass smoothing, comprising:
  a) a device comprising an integrated sensor assembly, configured to provide input data comprising sensor data acquired from the device and representing motion of the device at a plurality of epochs from a first instant to a second instant and a communications module for transmitting the input data; and b) remote processing resources configured to receive the input data from the device and having a processor configured to implement an MPS navigation module to derive an enhanced smoothed navigation solution for the device by:
  i) obtaining interim forward navigation solutions for the epochs;
  ii) performing backward processing of the input data to derive interim backward navigation solutions for the epochs;
  iii) combining at least one quantity of the navigation solution from the interim backward navigation solutions and an interim forward navigation solution to obtain a smoothed version of the at least one combined quantity;
  iv) performing forward processing of the input data and the at least one combined quantity to derive enhanced interim forward navigation solutions for the epochs;
  v) performing backward processing of the input data and the at least one combined quantity to derive enhanced interim backward navigation solutions for the epochs;
  vi) combining at least one uncombined quantity of the navigation solution from the enhanced interim forward and backward navigation solutions to obtain an enhanced smoothed navigation solution; and
  vii) providing the enhanced smoothed navigation solution.

48. The system of claim 47, wherein the device further comprises a navigation module to derive the interim forward navigation solution by performing forward processing of the input data, and wherein the input data transmitted by the communications module further comprises the interim forward navigation solution.

49. The system of claim 47, wherein the MPS navigation module on the remote processing resources is configured to derive the interim forward navigation solution by performing forward processing of the input data.

* * * * *